(12) United States Patent
Winterbottom et al.

(10) Patent No.: US 10,758,779 B2
(45) Date of Patent: Sep. 1, 2020

(54) ACTIVITY TRACKING SYSTEM WITH MULTIPLE MONITORING DEVICES

(71) Applicant: Under Armour Inc., Baltimore, MD (US)

(72) Inventors: Atherton Brant Winterbottom, Austin, TX (US); William Quast, Austin, TX (US); Corey Roberts, Austin, TX (US); Conrad Stoll, Austin, TX (US); Joshua Dale, Denver, CO (US); Skyler Whittlesey, Austin, TX (US); Allan Glen, Denver, CO (US); Christopher Peters, Austin, TX (US)

(73) Assignee: Under Armour, Inc., Baltimore, MD (US)

(*) Notice: Subject to any disclaimer, the term of this patent is extended or adjusted under 35 U.S.C. 154(b) by 155 days.

(21) Appl. No.: 15/896,873

(22) Filed: Feb. 14, 2018

(65) Prior Publication Data

US 2019/0247717 A1    Aug. 15, 2019

(51) Int. Cl.
*A63B 24/00* (2006.01)
*G09B 19/00* (2006.01)
(Continued)

(52) U.S. Cl.
CPC ...... *A63B 24/0062* (2013.01); *A63B 24/0003* (2013.01); *A63B 24/0021* (2013.01); *A63B 24/0084* (2013.01); *G06Q 10/0639* (2013.01); *G06Q 50/22* (2013.01); *G09B 19/0038* (2013.01); *A63B 2024/0065* (2013.01); *A63B 2071/0661* (2013.01); *A63B 2220/12* (2013.01); *A63B 2220/30* (2013.01); *A63B 2220/62* (2013.01); *A63B 2225/50* (2013.01)

(58) Field of Classification Search
CPC ........... A63B 24/0062; A63B 24/0084; A63B 24/0021; A63B 24/0003; A63B 2071/0661; A63B 2220/12; A63B 2220/62; A63B 2220/30; A63B 2024/0065; A63B 2225/50; G06Q 50/22; G09B 19/0038
See application file for complete search history.

(56) References Cited

U.S. PATENT DOCUMENTS 6,163,718 A * 12/2000 Fabrizio ............. A61B 5/02438
600/519
7,811,201 B1   10/2010 Mikan
(Continued)

*Primary Examiner* — Kevin Y Kim
(74) *Attorney, Agent, or Firm* — Maginot, Moore & Beck LLP

(57) ABSTRACT

A method for providing activity data to a user for a workout session includes receipt of first activity data from a first activity sensor and receipt of second activity data from a second activity sensor during the workout session. A first parameter is generated for a workout attribute based on the first activity data received during a first time interval of the workout session, and a second parameter is generated for the workout attribute based on the second activity data received during a second time interval of the workout session. An aggregate parameter for the workout attribute is generated based on both the first parameter and the second parameter. The first activity data and the second activity data generated during the workout session are transmitted to a remote server where a third parameter for the workout attribute is generated.

20 Claims, 10 Drawing Sheets

(51) Int. Cl.
*G06Q 50/22* (2018.01)
*G06Q 10/06* (2012.01)
*A63B 71/06* (2006.01)

(56) References Cited

U.S. PATENT DOCUMENTS

| | | | |
|---|---|---|---|
| 2003/0212579 A1* | 11/2003 | Brown | A61B 5/411 |
| | | | 705/2 |
| 2009/0047645 A1* | 2/2009 | Dibenedetto | G16H 15/00 |
| | | | 434/258 |
| 2009/0326981 A1* | 12/2009 | Karkanias | G06Q 10/10 |
| | | | 705/3 |
| 2011/0137678 A1* | 6/2011 | Williams | G06Q 50/22 |
| | | | 705/3 |
| 2013/0228063 A1 | 9/2013 | Turner | |
| 2014/0164611 A1 | 6/2014 | Molettiere et al. | |
| 2016/0180440 A1 | 6/2016 | Dibenedetto | |

\* cited by examiner

ACTIVITY TRACKING SYSTEM WITH MULTIPLE MONITORING DEVICES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The methods and systems disclosed in this document relate to the field of activity tracking systems for monitoring user activity and, in particular, activity tracking systems configured for use with multiple monitoring devices.

BACKGROUND

Active individuals, such as walkers, runners, and other athletes commonly use activity tracking systems to track workout attributes such as average speed and total distance traversed during a workout session. A user of an activity tracking system will typically carry one or more monitoring devices, such as a Global Positioning System (GPS) equipped smartphone or smartwatch, pedometer band, or sensor-equipped shoes to track activity data during the workout session. Unfortunately, the activity data obtained from any given monitoring device is sometimes incomplete, noisy, or somehow corrupt for a given workout session, resulting in inaccurate reporting of metrics for the workout session. In order to improve the user experience of activity tracking systems, it is desirable to increase the accuracy of the activity tracking system and the associated parameters reported in association with a workout session.

Accordingly, improvements in activity tracking systems are desirable.

SUMMARY

In accordance with one exemplary embodiment of the disclosure, an activity tracking system is configured to provide activity data associated with a user during a workout session, the workout session defined by a start time and an end time. The activity tracking system includes, a first activity sensor, a second activity sensor, a controller, a display device, and a remote server. The first activity sensor is configured to be carried by the user and generate first activity data during the workout session, the first activity data associated with a workout attribute of the workout session. The second activity sensor is configured to be carried by the user and generate second activity data during the workout session, the second activity data also associated with the workout attribute, but the second activity sensor being a different type of sensor than the first activity sensor. The controller is configured to receive both the first activity data from the first activity sensor and the second activity data from the second activity sensor during the workout session. The controller is further configured to generate a first parameter for the workout attribute based on the first activity data received during a first time interval of the workout session, generate a second parameter for the workout attribute based on the second activity data received during a second time interval of the workout session, and generate an aggregate parameter for the workout attribute based on both the first parameter and the second parameter. The display device is carried by the user during the workout session and includes a display screen configured to display the aggregate parameter for the workout attribute during the workout session. The remote server is configured to receive the first activity data and the second activity data generated during the workout session and generate a third parameter after the workout session based on at least one of the first activity data and the second activity data. The display device is configured to receive the third parameter from the remote server and display the third parameter on the display screen after the workout session.

Pursuant to another exemplary embodiment, a method is disclosed for providing activity data to a user for a workout session defined by a start time and an end time. The method comprises generating first activity data during the workout session using a first activity sensor carried by the user, the first activity data associated with a workout attribute of the workout session, and generating second activity data during the workout session using a second activity sensor carried by the user, the second activity data also associated with the workout attribute, the second activity sensor being a different type of sensor than the first activity sensor. The method further comprises receiving at a processor the first activity data from the first activity sensor and the second activity data from the second activity sensor during the workout session. Additionally, the method comprises generating at the processor a first parameter for the workout attribute based on the first activity data received during a first time interval of the workout session, generating at the processor a second parameter for the workout attribute based on the second activity data received during a second time interval of the workout session, and generating at the processor an aggregate parameter for the workout attribute based on both the first parameter and the second parameter. In addition, the method comprises displaying on a display device the aggregate parameter for the workout attribute during the workout session and transmitting the first activity data and the second activity data generated during the workout session to a remote server. The method also comprises generating, after the workout session at the remote server, a third parameter based on at least one of the first activity data and the second activity data, transmitting the third parameter to the display device, and displaying, on the display device, the third parameter after the workout session.

In accordance with yet another exemplary embodiment, a method is disclosed for automatically processing and reprocessing user activity data for a workout session performed by a user, the workout session defined by a start time and an end time. The method comprises first obtaining a set of rules that define workout parameters for at least one workout attribute as a function of events generated by a first activity sensor and a second activity sensor carried by the user. The method further comprises receiving a sequence of events from the first activity sensor and the second activity sensor during the workout session and generating a sequence of intermediate events based on the received sequence of events by evaluating the received sequence of events against the set of rules. Thereafter, the method comprises generating a stream of first workout parameters and a stream of second workout parameters based on the generated sequence of intermediate events by evaluating the generated sequence of intermediate events against the set of rules, each of the first workout parameters associated with the first activity sensor and each of the second workout parameters associated with the second activity sensor. The method further comprises generating a final stream of workout parameters by selecting final workout parameters from both the stream of first workout parameters and the stream of second workout parameters, and then generating an aggregate workout parameter for the workout session by evaluating the final stream of workout parameters against the set of rules. The method further comprises displaying the aggregate workout parameter on a display device carried by the user during the workout session.

These and other aspects shall become apparent when considered in light of the disclosure provided herein.

BRIEF DESCRIPTION OF THE FIGURES

The foregoing aspects and other features of an activity tracking system are explained in the following description, taken in connection with the accompanying drawings.

Figure 1:
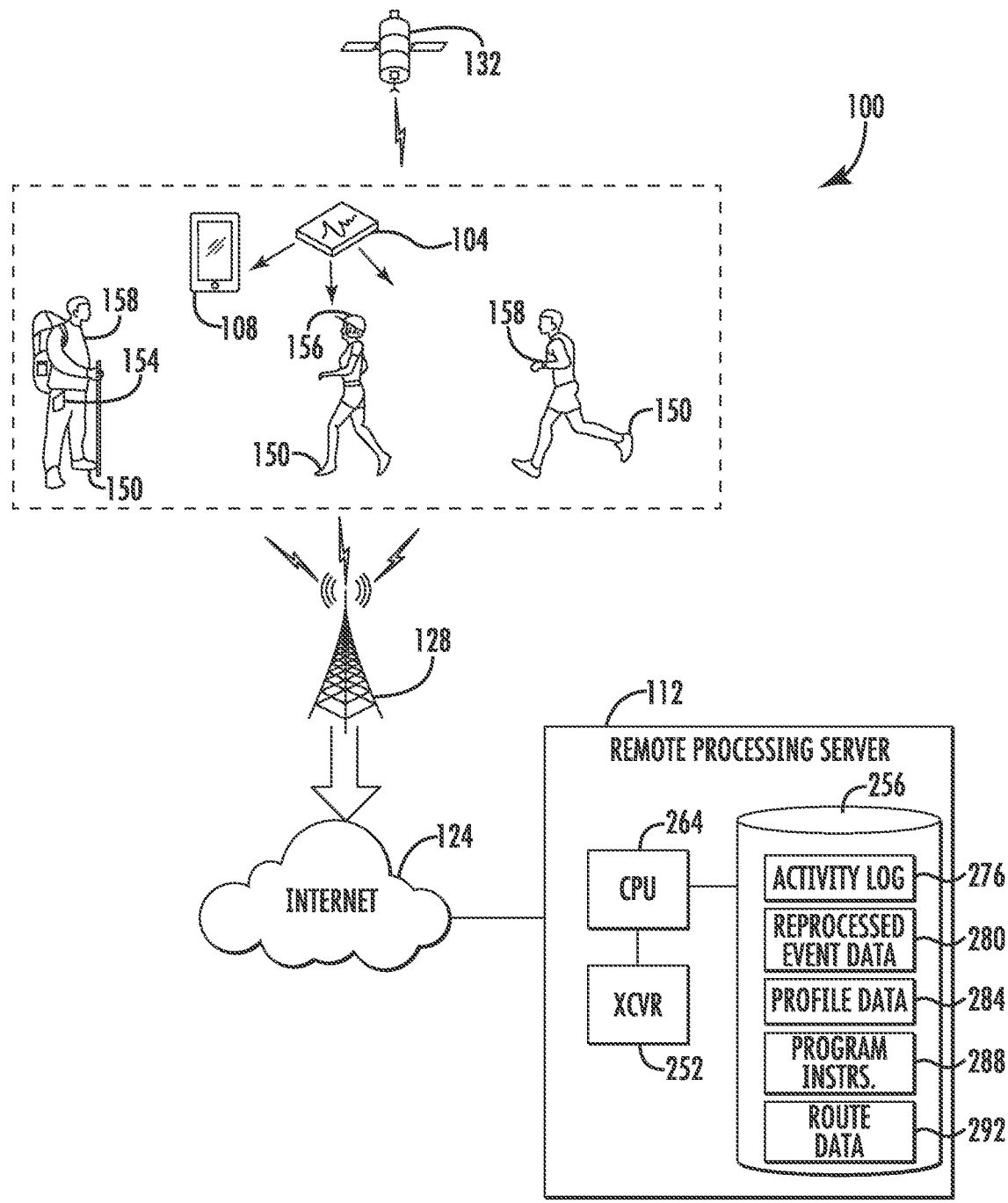
FIG. 1 is a diagram illustrating an activity tracking system, as disclosed herein.

All Figures © Under Armour, Inc. 2018. All rights reserved.

DETAILED DESCRIPTION

Disclosed embodiments include systems, apparatus, methods, and storage medium associated with collecting activity data from multiple monitoring devices carried by a user, processing the activity data based on the source of the activity data, and generating workout parameters based on the processing of the activity data.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Activity Tracking System

As shown in FIG. 1, an activity tracking system 100 includes a plurality of monitoring devices 104, a personal electronic device 108, and a remote processing server 112. The activity tracking system 100 collects activity data with the monitoring devices 104 while the user exercises during a workout session. Each of the monitoring devices 104 is associated with at least one workout attribute, such as distance, speed, heart rate, etc., and collects activity data associated with that attribute. The activity data collected by the monitoring devices is delivered to the personal electronic device 108 which processes the activity data and generates subsequent event data based on the activity data 136. The event data is processed to arrive at parameters for workout attributes associated with each of the monitoring devices. The personal electronic device is also configured to transmit all of the activity data collected by the personal electronic device 108 during the workout session to the remote processing server 112. The remote processing server 112 is configured to reprocess the activity data and generate parameters (e.g., numerical values or other measurable factors) for the workout attributes as well as additional event data. Various components of the activity tracking system 100 and method for operating the activity tracking system 100 are described in further detail herein.

With continued reference to FIG. 1, each monitoring device 104 is configured to be worn or otherwise carried by a user of the activity tracking system 100 and collect activity data associated with the user during a workout. Accordingly, the monitoring devices 104 may also be referred to herein as an "activity sensors." Each monitoring device is configured to monitor a different attribute related to a workout session. Examples of monitoring devices include heart rate sensors configured to monitor heart rate, position-tracking sensors configured to monitor distance traversed, or acceleration sensors configured to monitor acceleration of the user.

The monitoring devices 104 may be carried by the user during a workout session in different ways. For example, the monitoring devices 104 may be carried by the user in his or her hand (e.g., a smartphone or other personal electronic device), strapped onto the user (e.g., a watch or heart rate sensor), or incorporated into an article of apparel worn by the user (e.g., smart shoes, accessories, or clothing). In one embodiment, the monitoring device 104 is permanently embedded in the sole of a shoe 150 worn by the user such that the monitoring device 104 cannot be removed from the shoe 150 without destroying the shoe 150. The monitoring device 104 may also be configured for placement in the shoe 150, may be attached to the shoe 150, may be carried in a pocket 154 of the user's clothing, may be attached to a hat 156 worn by the user, and/or may be attached to any portion of the user or the user's clothing or accessories (e.g., wrist band, eyeglasses, necklace, visor, etc.). Moreover, in some embodiments, a left monitoring device 104 is located and/or affixed to the user's left shoe 150 and a right monitoring device 104 is located and/or affixed to the user's right shoe 150; both monitoring devices 104 being configured substantially identically.

In other embodiments, the monitoring device 104 includes a strap 158 to mount the monitoring device 104 onto the user. In this embodiment, the monitoring device 104 may be strapped to the user's wrist, arm, ankle, or chest, for example. In at least one embodiment, the strap 158 and the monitoring device 104 are provided as a watch or a watch-like electronic device. In a further embodiment, the monitoring device 104 is included in a heartrate monitoring device (not shown) that is worn around the wrist, chest, or other body location that is typically used to measure heart-rate. Thus, the monitoring device 104 is configured for mounting (permanently or removably) on any element of the user or the user's clothing, footwear, or other article of apparel using any of various mounting means such as adhesives, stitching, pockets, or any of various other mounting means. The monitoring device 104 is located proximate to the user during activities and workout sessions such as hiking, running, jogging, walking, and the like; whereas the personal electronic device 108 may be either carried by the user during a workout session or left behind by the user such that it is remote from the user during the workout session. In at least one embodiment, the components of the monitoring device 104 are included as part of the personal electronic device 108 (e.g., a GPS receiver or an accelerometer of a smartphone).

Figure 2:
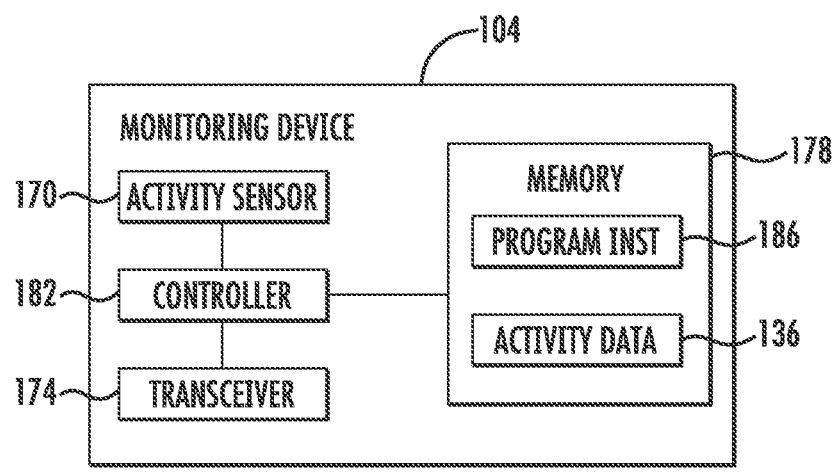
FIG. 2 is a diagram illustrating a monitoring device of the activity tracking system of FIG. 1.

With reference now to FIG. 2, an exemplary monitoring device 104 includes an activity sensor 170, a transceiver 174, and a memory 178, each of which is operably connected to a controller 182. The sensor 170 may be provided as any type of device configured to generate activity data 136 during a workout session of the user, such as an accelerometer, a heart rate sensor, a GPS receiver, a gyroscope, a magnetometer, a force sensor, or any of various other types of sensors. In at least one embodiment, the sensor 170 is an accelerometer configured to collect the activity data 136 in the form of acceleration data, which corresponds to acceleration of the user during a workout session. Specifically, the sensor 170 collects acceleration data that corresponds to bipedal movement of the user.

The activity data 136 collected by the sensor 170 is stored by the controller 182 in the memory 178. The sensor 170 is provided as any type of accelerometer, such as a single-axis or a multi-axis microelectromechanical (MEMS) accelerometer. The activity data 136 from the sensor may be further processed to derive additional data. For example, if the activity data 136 is acceleration data, the acceleration data may be processed to derive speed or distance data.

The transceiver 174 of the monitoring device 104, which transceiver may also be referred to herein as a wireless transmitter and/or receiver, is configured to transmit and to receive data from the personal electronic device 108. In one embodiment, the transceiver 174 is configured for operation according to the Bluetooth® wireless data transmission standard. In other embodiments, the transceiver 174 comprises any desired transceiver configured to wirelessly transmit and receive data using a protocol including, but not limited to, ANT+®, ZigBee®, infrared, Near Field Communication ("NFC"), IEEE 802.11, Global System for Mobiles ("GSM"), or Code Division Multiple Access ("CDMA").

The memory 178 of the monitoring device 104 is an electronic data storage unit, which is also referred to herein as a non-transient computer readable medium. The memory 178 is configured to store the program instruction data 186 and the activity data 136 generated by the sensor 170, as well as any other electronic data associated with the activity tracking system 100, such as user profile information, for example. The program instruction data 186 includes computer executable instructions for operating the monitoring device 104.

The controller 182 of the monitoring device 104 is configured to execute the program instruction data 186 for controlling the sensor 170, the transceiver 174, and the memory 178. The controller 182 is a provided as a microprocessor, a processor, or any other type of electronic control chip.

Figure 3:
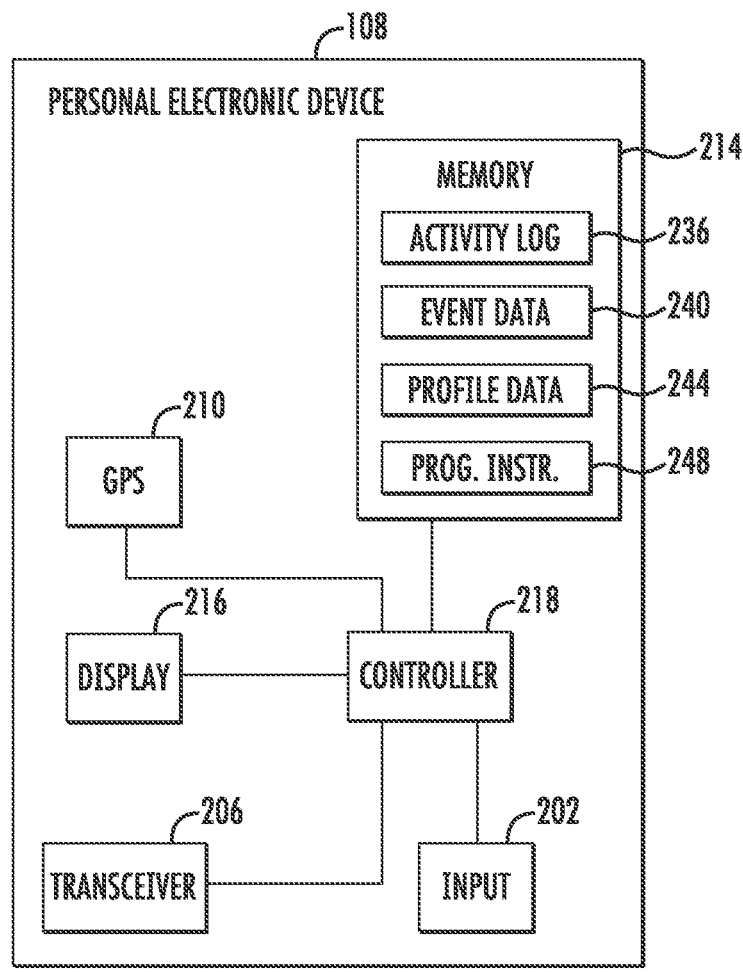
FIG. 3 is a diagram illustrating a personal electronic device of the activity tracking system of FIG. 1.

As shown in FIG. 3, an exemplary personal electronic device 108 is configured as a smartphone. In other embodiments, the personal electronic device 108 is provided as a smartwatch, an electronic wristband, or the like. In one embodiment, the personal electronic device 108 is carried by the user during the workout session as the monitoring device 104 collects the activity data 136. In another embodiment, the personal electronic device 108 is not carried or worn by the user during the workout session, and the personal electronic device 108 receives the activity data 136 from the monitoring device 104 after the user completes a workout session. In a further embodiment, data may be transmitted from the monitoring device 104 to the personal electronic device 108 both during and after completion of a workout session.

The personal electronic device 108 includes an input unit 202, a transceiver 206, a GPS receiver 210, a memory 214, and a display 216, each of which is operably connected to a processor or a controller 218. The display unit 216 is configured to display a visual representation of the event data 240 (e.g., the calculated speed, distance, stride length, cadence, and heart rate of the user as determined by the monitoring devices). The display unit 216 may comprise a liquid crystal display (LCD) panel configured to display static and dynamic text, images, and other visually comprehensible data. For example, the display unit 216 is configurable to display one or more interactive interfaces, display screens, or display screen sections to the user, such as, e.g., a display of distance traversed by the user, a display of the speed of the user, a display of the average stride length of the user, a display of the heart rate of the user. The display unit 216, in another embodiment, is any display unit as desired by those of ordinary skill in the art.

The input unit 202 of the personal electronic device 108 is configured to receive data input via manipulation by a user. The input unit 202 may be configured as a touchscreen applied to the display unit 216 that is configured to enable a user to input data via the touch of a finger and/or a stylus. In another embodiment, the input unit 202 comprises any device configured to receive user inputs, as may be utilized by those of ordinary skill in the art, including e.g., using one or more buttons, switches, keys, and/or the like.

With continued reference to FIG. 3, the transceiver 206 of the personal electronic device 108 is configured to wirelessly communicate with the transceiver 174 of the monitoring device 104 and the remote processing server 112. The transceiver 206 wirelessly communicates with the transceiver 174 of the monitoring device using any of various short range wireless communications protocols, such as those discussed previously in association with the transceiver 174 of the monitoring device 104. The transceiver wirelessly communicates with the remote processing server 112 either directly or indirectly via the cellular network 128 (FIG. 1), a wireless local area network ("Wi-Fi"), a personal area network, and/or any other wireless network over the Internet 124. Accordingly, the transceiver 206 is compatible with any desired wireless communication standard or protocol including, but not limited to, Near Field Communication ("NFC"), IEEE 802.11, Bluetooth®, Global System for Mobiles ("GSM"), and Code Division Multiple Access ("CDMA"). To this end, the transceiver 206 is configured to wirelessly transmit data to and receive data from the remote processing server 112, and to wirelessly transmit data to and receive data from the monitoring device 104.

The GPS receiver 210 of the personal electronic device 108 is configured to receive GPS signals from GPS satellites 132 (see FIG. 1). The GPS receiver 210 is further configured to generate location data 224 that is representative of a current location on the Earth of the personal electronic device 108 based on the received GPS signals. The location data 224, in one embodiment, includes latitude and longitude information. The controller 218 is configured to store the location data 224 generated by the GPS receiver 210 in the memory 214. Because the GPS receiver is a sensor configured to monitor position and the controller 218 is configured to determine distance traversed by the user based on the GPS data, the personal electronic device 108 itself may be considered a monitoring device 104.

As shown in FIG. 3, the memory 214 of the personal electronic device 108 is an electronic data storage unit, which is also referred to herein as a non-transient (or non-transitory) computer readable medium. The memory 214 is configured to store electronic data associated with operating the personal electronic device 108, processing of the activity data, and presentation of related information on the display 216. Accordingly, the memory 214 includes an activity log 236, event data 240, user profile data 244, and program instructions 248.

The activity log 236 is a log of all activity data 136 received by the personal electronic device 108 from one or more of the monitoring devices 104 during a workout session. The activity log 236 will therefore include a time-stamped series of activity data 136 from various monitoring devices, such as a recently sampled heart rate from a heart rate monitor, accelerometer data from a foot pod of a shoe, a series of GPS coordinates received from a GPS receiver, or any of various other types of activity data in any of various forms. The activity log 236 may be limited in some manner, such as a log of the activity data from a limited number of recent number of workout sessions of the user.

The event data 240 stored in the memory 214 is derived from the activity data 136 received for a particular workout session. The event data 240 is essentially a log of all of the data that is processed during the workout session, including the activity data. The event data includes parameters associated with a particular attribute for a workout session, such as, for example, average speed (e.g., a mean, median or mode speed), total distance traveled, current pace, current heart rate, average heart rate, peak heart rate, cadence, interval speed, etc.; the event data also includes other data generated to arrive at such parameters. As explained in further detail below, the event data 240 is generated by applying a set of rules to at least a subset of the activity data 136. In one embodiment, the rules of the set of rules are categorized as mathematical operations, event-specific operations, and processed signals. Similar to the activity log 236, the event data 240 may be limited in some manner, such as limited to the event data from a limited number of recent number of workout sessions of the user.

The user profile data 244 is based on personal information specific to the user and may include user gender, user height, user weight, user body mass index ("BMI"), and user age, among other data. Any other user demographic and/or psychographic data may be included in the user profile data 244.

The controller 218 of the personal electronic device 108 is operatively connected to the monitoring device 104 and is configured to execute the program instructions 248 in order to control the display unit 216, the input unit 202, the transceiver 206, the GPS receiver 210, the memory 214, and the monitoring device 104. The controller 218 is provided as a microprocessor, a processor, or any other type of electronic control chip. The controller 218 is further configured to process at least subset of the received activity data 136 and generate the event data 240 by applying at least one rule of the set of rules to the subset of the activity data 136. As explained in further detail below, the program instructions define rules for managing data that is received and output during a workout session. That set of rules for processing and managing event data may be referred to herein as a "studio"

With reference again to FIG. 1, the remote processing server 112 (which may also be referred to herein as simply a "remote server") is remotely located from the monitoring device 104 and the personal electronic device 108. That is, the remote server 112 is located in a first physical location and the personal electric device 108 and the monitoring device 104 are located in a second physical location that is different from the first physical location. In particular, the personal electronic device 108 and the monitoring device 104 are either carried by the user during a workout session or located at a permanent or temporary residence or workplace of the user; in contrast, the remote server 112 is installed at a permanent location that is typically unknown to the user and controlled by the administrator of the activity tracking system 100.

The remote server 112 includes a transceiver 252 and a memory 256 operably connected to a central processing unit ("CPU") 264. The memory 256 includes an activity log 276, event data 280, user profile data 284, program instructions 288, and additional data such as route data 292.

The remote server 112 receives data from the personal electronic device 108. Accordingly, the transceiver 252 of the remote server 112 is configured to wirelessly communicate with the personal electronic device 108 either directly or indirectly via the cellular network 128, a wireless local area network ("Wi-Fi"), a personal area network, and/or any other wireless network. The transceiver 252 is compatible with any desired wireless communication standard or protocol including, but not limited to, Near Field Communication ("NFC"), IEEE 802.11, Bluetooth®, Global System for Mobiles ("GSM"), and Code Division Multiple Access ("CDMA"). Because the memory 256 of the remote server is significantly larger than that of the personal electronic device 108, all (or a significant amount) of the activity data for workout sessions received from the personal electronic device 108 may be stored in the activity data log 276.

The CPU 264 of the remote server 112 is configured to execute the program instructions 288 stored in the memory 256. The CPU 264 is provided as a microprocessor, a processor, or any other type of electronic control chip. Typically, the CPU 264 is more powerful than the controller 218 of the personal electronic device 108, thereby enabling the remote server 112 to generate the event data 280 more quickly than the personal electronic device 108.

The information the remote server 112 receives from the personal electronic device 108 includes the activity log 236, the event data 240 for a workout session, and the user profile data 244 for a user. The remote server 112 is configured to reprocess the activity data 136 for any given workout session and generate reprocessed event data 280. As described in further detail below, the rules used by the remote server 112 to generate the event data 280 are the same or similar to those rules used by the personal electronic device 108. However, the remote server also makes use of additional data and rules to generate the event data 280 stored in the memory 256. In particular, the remote server 112 may have access to route data 292 (e.g., elevation), or may make use of additional rules and metrics in order to generate additional event data that was not generated by the personal electronic device 108. For example, the remote server 112 may be configured to generate a revised calculation of elevation change based on map data available to the remote server 112 that was not available to the personal electronic device 108. As another example, the remote server 112 may be configured to generate a revised calculation of calories burned by the user during a workout session based on new temperature or atmospheric condition information that was not available to the personal electronic device 108 but is available to the remote server 112. In this manner, the event data 280 at the remote server 112 may include more accurate parameters for a workout attribute than those generated by the personal electronic device 108. Moreover, the event data 280 at the remote server 112 may include entirely new parameters for a workout attribute that was not generated by the personal electronic device. This reprocessed event data 280 at the remote server 112 may then be transmitted back to the personal electronic device 108 for presentation to the user.

Rules for Generation of Events

Figure 4:
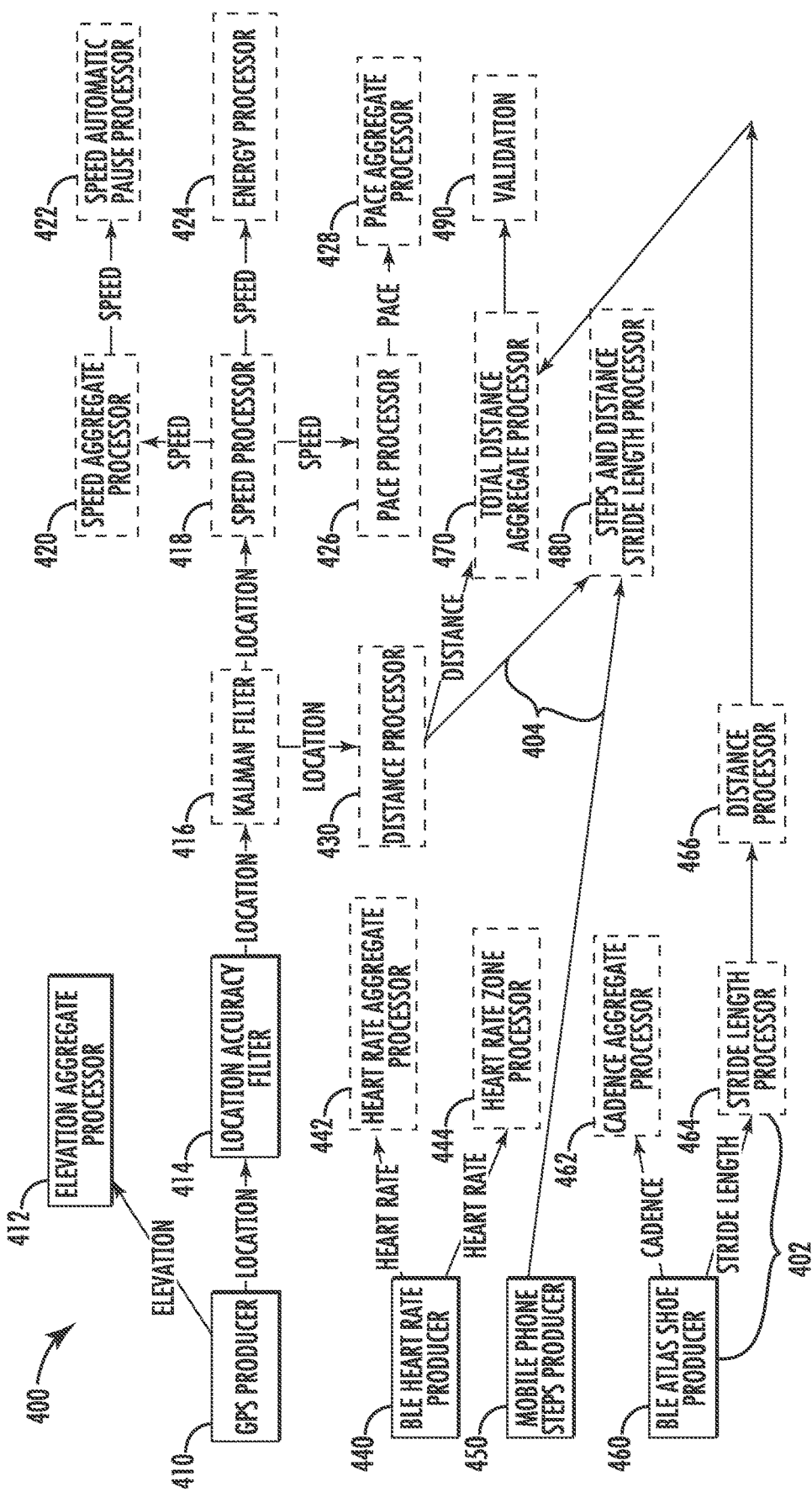
FIG. 4 is a graph illustrating a defined set of rules for generating event data from activity data in the activity tracking system of FIG. 1.

With reference now to FIG. 4, a graph 400 illustrates an exemplary studio for processing activity data within the activity tracking system 100 at the personal electronic device 108 and/or the remote server 112. As noted previously, the term "studio" as used herein refers to the rules for managing data during a workout session. The studio is comprised of data "producers" and "processors" that generate and manage data based on the type of data being processed and recorded during the workout session. A "producer" is something that generates an event from an external source (e.g., an activity sensor) and thus provides data to the studio for processing. Examples of producer data include heart rate data from a heart rate sensor, GPS data from a GPS receiver, acceleration data from an accelerometer, or any of various other types of data that may be collected during a workout session. A "processor" processes data from various sources (whether producers or other processors) and generates output events based on the input event. A queueing system defined by the studio distributes events through the studio and controls the order of events that are delivered from producers and dispatched to processors.

FIG. 4 shows an exemplary embodiment of a graph 400 illustrating a simplified studio arrangement. In the exemplary embodiment of FIG. 4, the graph 400 includes a plurality of nodes 402 (as indicated by the box-like structures) and a plurality of edges 404 (as indicated by the arrows extending between the nodes). Each node 402 is associated with either a data "producer" or a data "processer" and such nodes may therefore be referred to herein as either "producers" or "processors." The edges 404 represent the flow of events between the nodes.

In the graph 400, the activity data producers include a GPS producer 410, a heart rate producer 440, a mobile phone step producer 450, and a shoe step producer 460. As explained herein, each of these activity data producers generates events during the workout session in the form of activity data. These events are processed by the system as defined by the nodes 402 and the edges 404 of graph 400. The GPS producer 410 is associated with a GPS receiver and generates a periodic stream GPS coordinates during the workout session (i.e., latitude and longitude coordinates). The heart rate producer 440 is associated with a heart rate monitor and generates a pulse signal of the user's heart rate during the workout. The mobile phone step producer 450 is associated with a smartphone and generates a signal from an accelerometer or other movement sensor within the smartphone. Similarly, the shoe producer 460 is associated with a smart shoe and generates a signal from an accelerometer or other movement sensor embedded within the shoe. As explained in further detail below, the events from the producers 410, 440, 450, and 460 are received by various processors 412-490, each of which define rules for processing a previous event and arriving at either an intermediate event, or a final event. A "final" event refers to data in the form of a calculated parameter for a workout attribute (e.g., distance traversed, average heart rate, average stride length, cadence, etc.) that is ready for presentation to the user and the output event is not delivered to any other nodes (i.e., no edges extend from the output of the associated processor to another processor in the graph 400). An "intermediate" event refers to data that is further processed prior to arriving at some final workout parameter (i.e., at least one edge extends from the output of the associated processor in the graph 400). The studio outputs a sequence of intermediate events and final events in the course of processing. As described in further detail below, some of the intermediate events and all of the final events are parameters (e.g., numerical values or ranges) for a workout attribute.

An example of data flow through the graph 400 of FIG. 4 is now described with reference to the producers 410, 440, 450 and 460, with reference first to the GPS producer 410. The GPS producer 410 outputs a stream of activity data in the form of GPS coordinates that include location coordinates (i.e., latitude and longitude). The GPS producer 410 may also output some elevation data. The elevation data is provided to processor 412, and if available, the location data is delivered to processor 414.

Processor 412 is configured to determine total elevation change of the user over the course of the workout. Accordingly, processor 412 receives the stream of elevation data from the GPS producer 410, calculates an elevation change for each subsequent piece of elevation data, aggregates the total elevation change over time, and eventually arrives at a total elevation change for the user during the complete workout session. Because processor 412 is not connected to any other nodes and the output of processor 412 is ready for presentation to the user, the output of the processor 412 may be considered a "final" event generated by the rules.

Processor 414 receives the location coordinates from the GPS producer 410 and performs location accuracy filtering on the location coordinates. The location accuracy filter is configured to receive a GPS coordinate and filter out erroneous or unreliable coordinates based on any of various factors such as noise, strength of signal, etc. The output of the processor 414 is delivered to processor 416. Accordingly, the output of the processor 414 is an "intermediate" event in the embodiment of graph 400, and the processor 414 outputs a sequence of intermediate events during the workout session.

Processor 416 is a Kalman filter. The Kalman filter is configured to receive a stream of GPS coordinates and make an estimation of the next coordinates that are likely to be received in the stream. In the event the next coordinates that are actually received are improbable based on the estimation, the Kalman filter modifies the GPS coordinates to make them closer to the estimated coordinates. The output from the processor 416 is another intermediate event that is delivered to the processor 418 and processor 430.

Processor 418 receives the location data from processor 416 and calculates an instantaneous speed of the user based on the most recent location data. For example, processor 418 may calculate a distance between two GPS coordinates and divide that distance by the difference in time when the coordinates were received to arrive at a speed of the user. Processor 418 may also make the appropriate conversions to convert the calculated speed into more standard units that will be better understood by the user (e.g. conversion from meters/second to km/hour or miles/hour). The output from processor 418 provides a parameter for a workout attribute (i.e., an instantaneous speed), and is yet another intermediate event that is delivered to processors 420, 424, and 426.

Processor 420 is an aggregate speed processor that receives all of the speed calculations from processor 418 and arrives at an average speed for the workout session. The average speed for the workout session is calculated in real time (i.e., the average is calculated repeatedly over the entire workout session) with a final average speed calculated at completion of the workout session. The average speed may be calculated in any of various manners, such as a mean, mode, or median speed. The output from processor 420 is another intermediate event that is delivered to processor 422.

Processor 422 is an automatic pause processor for speed. This processor is configured to account for brief periods of little movement in a workout session, such as times when a runner has temporarily suspended forward progress during a workout in order to wait on a traffic light. To this end, the processor 422 is configured to remove any speed readings that fall below a threshold speed (e.g., less than 1.5 mph). As a result, the aggregate speed calculated during the workout will not include any brief periods of pause during the workout, and will thereby provide the user with a more accurate calculation of his or her actual speed during the workout session. The speed output from processor 422 is a final event that is not delivered to any other processors in the graph 400. The output from the processor 422 is also an example of a numerical parameter for a workout attribute (i.e., average speed), and a sequence of these parameters is generated over time as the average speed parameter changes over the course of the workout.

Returning again to processor 418, the speed output from processor 418 is also delivered to the energy processor 424. The energy processor 424 uses the speed data from processor 418 along with the user profile data 284 (e.g., weight, height, gender, etc.) and calculates an estimate of the aggregate energy expended by the user during the workout session (e.g., in total calories). The energy output is a final event that is not delivered to any other processors in the graph 400. Similar to other processors in the graph 400, the processor 418 generates a sequence of events over the course of the workout, and particularly a sequence of energy parameters that increases over the course of the workout to show energy expended by the user.

In addition to the above, the output from processor 418 is also delivered to processor 426. Processor 426 converts the instantaneous speed of the user (in distance per unit of time, e.g., km/hour) to a pace (in time per unit of distance, e.g., minutes/km). The output from processor 426 is delivered to processor 428.

Processor 428 is an aggregate pace processor that receives all of the pace calculations from processor 426 and arrives at an average pace for the workout session. The average pace for the workout session is calculated in real time (i.e., is calculated repeatedly over the workout session and reported to the user), with a final average pace calculated at completion of the workout session. The average pace may be calculated in any of various manners, such as a mean, mode, or median pace. The output from processor 428 is a final event that is not delivered to any other processors.

Returning to processor 416 on the graph 400 of FIG. 4, the location output from processor 416 is also delivered to distance processor 430. The distance processor 430 receives the location data from processor 416 and calculates a distance traveled base on the most recent location data. For example, processor 430 may calculate a distance between the most recent pair of GPS coordinates received from processor 416. Accordingly, the output from processor 430 is a distance traveled for some short period of the workout (e.g., 0.5 seconds, 5 seconds, 10 seconds, etc.), depending on the time receipts for the two GPS signals. As shown by the edges of the graph 400, the output from the distance processor 430 is another intermediate event that is delivered to processor 470 and processor 480. As explained in further detail below, processor 470 calculates an aggregate distance traveled for the workout based at least in part on the event data received from the distance processor 430. Processor 480 generates a stride length for the user based in part on the event data received from the distance processor 430.

In addition to events from the GPS producer 410, the graph 400 also processes events from other producers 440, 450, and 460. The heart rate producer 440 outputs a stream of activity data in the form of pulse signals representative of the user's heart rate. The activity data for the heart rate producer 440 may be generated from any of various devices, such as a chest strap configured to receive electrical signals from the heart, or a wrist strap configured to monitor the user's pulse through "photo plethysmography" (PPG, i.e., the process of using light to measure blood flow). While the graph 400 of FIG. 4 shows only a single heart rate producer, in at least some embodiments, the user of the activity tracking system may use two or more heart rate sensors, each of which output heart rate data as event to different processors. In the embodiment of FIG. 4, the heart rate data is output to processors 442 and 444.

Processor 442 is configured to receive the heart rate data from the heart rate producer 440 and generate an instantaneous heart rate as well as some type of aggregate heart rate for the workout session. The instantaneous heart rate is the user's current heart rate during the workout session (e.g., 140 beats per minute). The aggregate heart rate is the user's average heart rate (e.g., mean, median, mode, etc.) over the entire workout session. The output from processor 442 provides a parameter for a workout attribute (e.g., an average heart rate), and is another final event that is not delivered to any other processors in the embodiment of FIG. 4. However, it will be recognized that if multiple heart rate producers are utilized during the workout session, the output of processor 442 may be delivered to another heart rate processor (not shown in FIG. 4) to determine which heart rate data should be used to arrive at the desired parameter for average heart rate or other workout attribute. The rules for determining what heart rate data to use for any given period of a workout session may depend on a number of factors such as, for example, a preferred source of heart rate data (e.g., a chest strap preferred over a wrist strap), the integrity of the data from a particular source (e.g., the quality or clarity of the data or lack thereof), the time during the workout session in which the data is received (e.g., a wrist-based heart rate monitor may be preferred early in the workout session, but a chest strap heart rate monitor may be preferred after the warm-up period), user preferences or user profile data (e.g., the age or condition of a sensor that produces data), environmental conditions for the workout session (e.g., on particularly cold and dry days a wrist-based heart rate monitor may be preferred over a chest strap heart rate monitor), or any of various other factors, as explained in further detail below.

Processor 444 is also configured to receive the heart rate data from the heart rate producer 440 and determine various "zones" for the user heart rate data. For example, the processor 444 may determine that the user is in one of five different zones (e.g., low/resting, light, moderate, vigorous, and peak heart rate zones) based on the instantaneous heart rate data. These heart rate zones are unique to a user and are determined based on the user profile data (e.g., the user's age, gender, etc.). When a user is in a particular zone, a corresponding color for that zone (e.g., blue, green, yellow, orange and red zones) may be presented to the user on his or her personal electronic device 108. The processor 444 is configured to generate both instantaneous heart rate zone information as well as time spent in each zone during the workout session. Because processor 444 is not connected to any other nodes, the output of the processor 444 may be considered a "final" event generated by the graph 400.

The mobile phone steps producer 450 is configured to generate a step count for the user during the workout session. Commonly, an accelerometer on the user's smartphone is used to generate the step count for a workout session. For example, if a user runs a mile during a workout session, the user's smartphone may determine that he or she took about 1,500 steps during a mile run. This parameter is then delivered to the steps and distance stride length processor 480. While the step count parameter has been described in the exemplary embodiment of FIG. 4 as being received from a smart phone, it will be recognized that in other embodiments the step count may be received from any number of other producers, such as a smart watch, or a wrist band configured to track steps taken by the user.

The steps and distance stride length processor 480 is configured to receive both the step count for the workout session from producer 450 and the total distance traversed from processor 430. With this information, the processor 480 divides the total step count by the distance traveled to arrive at a calculation of average stride length. For example, if the user took 1,200 steps in travelling a mile, the average stride length would be 4.4 feet/stride (i.e., 5280 feet/1200 strides=4.4 feet/stride). Because processor 480 is not connected to any other nodes, the output of the processor 480 is a "final" event generated by the graph 400.

The shoe producer 460 is configured to generate an electrical signal that is representative of the user's stride. The electrical signal includes characteristic portions that indicate the amount of time the user's foot is on the ground and the amount of time the user's foot is in the air for each stride. The activity data from the shoe producer is output to processor 462 and processor 464.

Processor 462 is configured to receive the signals from the shoe producer 460 and generate an average cadence for the user during the workout session. For example, if six hundred stride signal pulses are received from the shoe producer 460 over a five minute period, the user's cadence would be 120 strides per minute (i.e., 600 strides/5 minutes=120 strides/minute). Because processor 462 is not connected to any other nodes, the output of the processor 462 may be considered a "final" event generated by the graph 400.

Processor 464 is also configured to receive the signals from the shoe producer 460 and generate a stride length for the user based on any of various data collected by the system, including the user profile data (e.g., height, weight, etc.) or the acceleration data from the shoe producer. For example, based on the user profile data, and particularly the user's gender, height and weight, a look-up table of typical stride lengths may be consulted to determine an estimated stride length for the user. Alternatively, in a more accurate embodiment, the system may analyze the acceleration data associated with the shoe when it is off the ground (i.e., the signal from the shoe producer will provide a characteristic signal as the user runs, including shoe-on-the-ground and shoe-off-the-ground portions for each signal pulse). By integrating the acceleration data during times the shoe is off the ground, a velocity of the user may be determined. By integrating the velocity of the user, a distance traversed may be determined. The distance traversed between foot strikes is the stride length of the user. The stride length data of each foot strike may be calculated as the user runs and the calculated stride lengths are output to distance processor 466. It will be noted that the stride length generated at processor 464 is likely to be slightly different than the stride length used to generate the stride length at processor 480 because different metrics are used to calculate the stride length at the two processors 480 and 464.

The distance processor 466 takes the stride length data from stride length processor 464 and sums the distance traveled with each stride of the user to arrive at total distance traveled for the user during the workout session. This distance is aggregated over the course of the workout session, so the total distance traveled at any time during the workout session is available for output by the distance processor 466 as an intermediate event. The output of the distance processor 466 is delivered to the total distance aggregate processor 470.

The total distance aggregate processor 470 receives intermediate events from both the first distance processor 430 (i.e., the GPS distance processor) and the second distance processor 470 (i.e., the stride length distance processor). Advantageously, the total distance aggregate processor is configured to select which events to use (i.e., from the first distance processor 430 or the second distance processor 466) when arriving at an aggregate distance traversed by the user during the workout session. In particular, the processor 470 is configured to selectively switch between distance data from the first distance processor 430 and distance data from the second distance processor 466 when arriving at an aggregate distance traveled for the workout session. For example, the processor 470 may use the distance data from the first distance processor 430 during a first time period of the workout session, the distance data from the second distance processor 466 during a second time period of the workout session, and return again to use of the distance data from the first distance processor 430 during a third time period of the workout session. What specific data is used by the processor 470 during any given period of time in aggregating the total distance will depend on a number of factors, such as, for example, a preferred source of distance data (e.g., GPS distance data from the first distance processor 430 may be preferred to stride length distance data from the second distance processor 466), the integrity of the data received from the associated producer (e.g., clear, high quality data is preferred over noisy, weak data), the time during the workout session in which the data is received (e.g., early in the workout session or late in the workout session), user preferences or user profile data (e.g., the age or condition of a sensor that produces data), environmental conditions for the workout session, or any of various other factors.

The output of the total distance aggregate processor 470 is delivered to the validation processor 490. The validation processor 490 cooperates with the remote server 112 to determine whether the event output from processor 470 is valid or the most accurate data. In particular, either during or after a workout session, the event log for the workout session is transmitted to the remote server 112 where additional processing on the event log occurs. Based on the processing at the remote server 112, the event output from processor 470 is subjected to a validation process. The validation process may confirm that the final events are correct, revise the final events in some manner to make the event data more accurate, or update the final event data with supplemental data.

As described above in association with FIG. 4, the nodes 402 and edges 404 of the studio graph 400 define the rules for processing of data. Moreover, each event within the studio graph 400 indicates a source of the event (i.e., a previous processor or producer). In this manner each event may be associated with a previous processor and, ultimately, associated with a previous producer 410, 440, 450 or 460.

Studio Queue

As noted previously, the studio defines a queueing system that distributes events through the studio and controls the order of events that are dispatched to processors. With reference now to FIGS. 5A-5F an exemplary sequence of events processed by a first-in-first out (FIFO) queue defined by the studio is shown. In the example of FIGS. 5A-5F, the studio includes the same producers as the graph 400 of FIG. 4, and particularly a GPS producer 410 and a heart rate producer 440.

With reference now to FIGS. 5A-5F, the string of arrow-shaped polygons in each figure represents a FIFO queue 500 with a plurality of instructions/commands 502 therein, with each separate arrow-shaped polygon representing a separate instruction. Each instruction 502 is generated by one of the producers or processors of the graph 400 of FIG. 4, and describes a command for an event. Each event includes information about the source of the event (e.g., location information from GPS producer 410), and each command 502 describes where the event should go next on the graph 400 for further processing (e.g., to location accuracy filter 414). With this in mind, FIGS. 5A-5F are best understood in association with the graph 400 of FIG. 4.

Figure 5A:
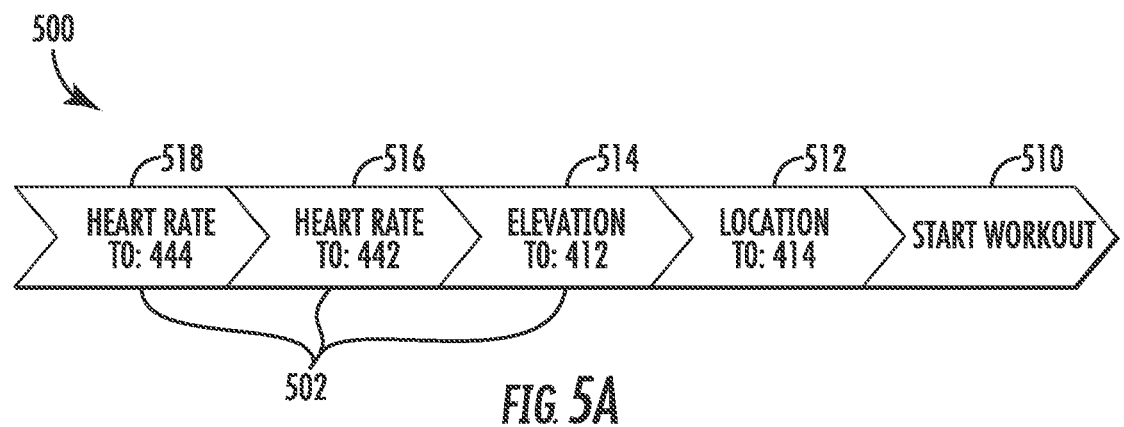
FIG. 5A is a diagram illustrating a queue wherein a series of commands generated according to the graph of FIG. 4 and processed through the queue.

With particular reference now to FIG. 5A, the exemplary queue 500 includes a number of events that were received sequentially by the queue, including a "Start Workout" event 510, a "Location to: 414" event 512, an "Elevation to: 412" event 514, a "Heart Rate to: 442" event 516, and a "Heart Rate to: 444" event 518. The events in the queue 500 are then processed sequentially starting with the "Start Workout" event 510, which was received first.

The "Start Workout" command 510 was generated manually by a user controlled event or studio management producer. For example, on one embodiment, the "Start Workout" command is generated when the user selects a "start workout" option on the graphical user interface of his or her personal electronic device 108. In another exemplary embodiment, a studio producer and/or processor is configured to detect that the user has started a workout and automatically generate the "Start Workout" command (e.g., based on the data from a monitoring device, a processor may detect that the user has taken more than a threshold number of steps within a predetermined period of time, and generate the "Start Workout" command when this threshold is met). In any event, receipt of the "Start Workout" event indicates a start time for a workout session. The workout session then continues until an "End Workout" event is received, indicating an end time for the workout session. Similar to the "Start Workout" event, the "End Workout" event may be generated by the user via a personal electronic device or automatically generated based on data received from a monitoring device.

Figure 5B:
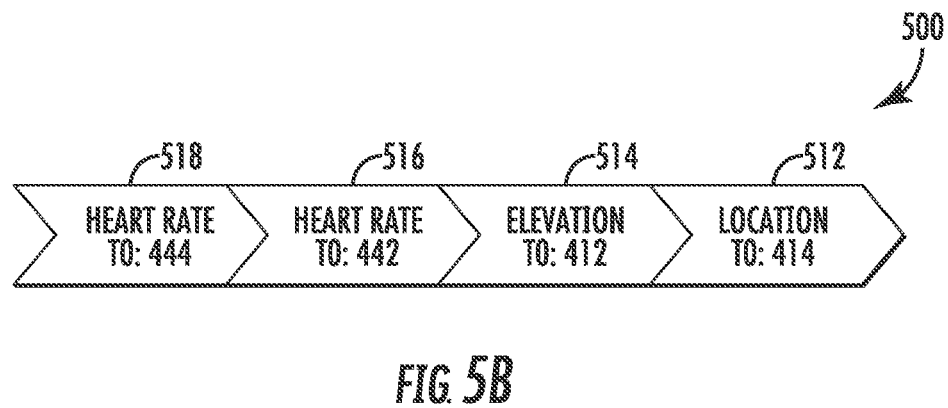
FIG. 5B shows the queue of FIG. 5A after processing a first command.

After the "Start Workout" event is processed, the queue 500 looks like that shown in FIG. 5B. The first event received for processing after the start of the workout session is a location event, as indicated by the "Location to: 414" command 512. This command sends the location information from the GPS producer 410 (as shown in FIG. 4) to the location accuracy filter 414. The location accuracy filter 414 receives its location data point event (i.e., GPS generated longitude and latitude) and starts processing it. When the location accuracy filter 414 has finished processing, it sends the filtered location data point event back to the studio. The studio receives that event and, based on the graph 400 with only one edge connected to the location accuracy filter 414 (i.e., the edge leading to the Kalman filter 416), the studio adds just a single command to the end of the queue 500. In particular, the "Location to: 416" command 520 is added to the end of the queue 500, as shown in FIG. 5C.

It will be recognized that although node 414 was only associated with a single edge, and therefore only one command was generated in the queue following processing of this node 414, other nodes may be associated with multiple edges. For example, the GPS producer 410 is associated with two edges: one edge to the location accuracy filter 414 and another edge to the elevation aggregate processor 412. Accordingly, there are two location event commands in the queue 500, including both the "Location to: 414" command 512 and the "Elevation to: 412" command 514, which are both associated with a single producer in the studio graph 400, i.e., the GPS producer 410, and are processed by the studio in a predetermined order.

Figure 5C:
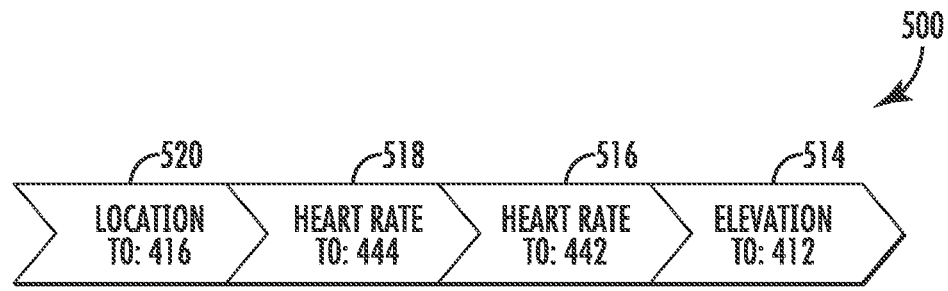
FIG. 5C shows the queue of FIG. 5B after receiving an additional command.

With particular reference to FIG. 5C, after command 512 is processed (as shown in FIG. 5B), the "Elevation to: 412" command 514 is the next command processed in the queue 500. This command 514 sends a GPS elevation data point from the GPS producer 410 to the elevation aggregate processor 412 which performs some aggregation calculation on the data. In various embodiments the processor 412 may add some elevation stats to an aggregate, writes the elevation to a data series, and/or updates the user interface on the personal electronic device 108 with the current altitude. As shown in FIG. 4, the output of the processor 412 is not connected to any other edges, so when the elevation aggregate processor 412 sends its resulting data point event back to the studio, the studio graph 400 finds no edges attached to it and doesn't add any new event deliveries to the queue 500.

With continued reference to FIG. 5C, after processing of the "Elevation to: 412" command 514, heart rate commands (which were also received immediately after the start of the workout session) are next processed by the queue 500. Two commands are associated with each heart rate event, including a "Heart Rate to: 442" command 516, and a "Heart Rate to: 444" command 518. The "Heart Rate to: 442" command 516 delivers heart rate data from the heart rate producer 440 to the processor 442 where an aggregate/average heart rate is calculated during the workout session (e.g., a mean, mode or median heart rate is determined at processor 442). Similarly, the "Heart Rate to: 444" command 518 delivers the heart rate data from heart rate producer 440 to the processor 444, where a current heart rate zone is determined. Because neither of nodes 442 or 444 are not associated with any edges at their outputs, the studio simply notifies the associated monitoring device 104 and/or personal electronic device 108 of the events, and no new commands are entered in the queue. However, receipt of an event from the studio may result in associated information being presented on the GUI of the monitoring device 104 or personal electronic device 108. For example, a heart rate zone determined by the studio will result in an associated color being presented to the user on the GUI of the monitoring device 104 or personal electronic device 108.

Figure 5D:
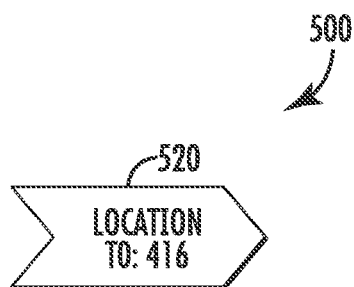
FIG. 5D shows the queue of FIG. 5C after processing a number of commands.
Figure 5E:
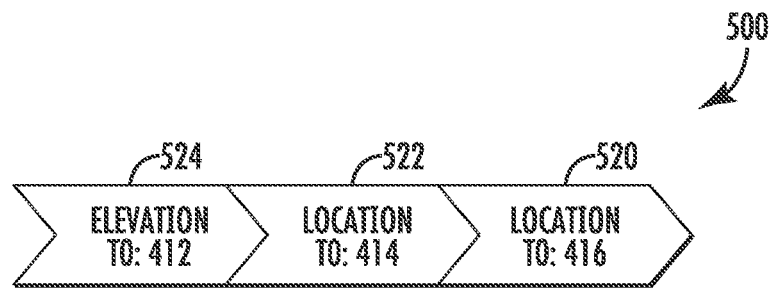
FIG. 5E shows the queue of FIG. 5D after receiving additional commands.

With reference now to FIG. 5D, after commands 514, 516 and 518 are processed, the only remaining command in the queue is the "Location to: 416" command 520. However, it will be recognized that as commands are processed, additional commands are continually generated and inserted into the queue 500. As an example, as the elevation aggregate processor 412 and heart rate processors 442 and 444 were processing their commands, the GPS Producer 410 received a GPS update from associated GPS sensor (e.g., a GPS sensor on the personal electronic device 108) and sent a location data point event for that data point to the studio. Thus, as shown in FIG. 5E, two new commands associated with each GPS data point are received in the queue 500, including the "Location to: 414" command 522, and the "Elevation to: 412" command 524.

When the "Location to: 416" command 520 is processed, the Kalman filter 416 processes the associated GPS location event and sends a new/updated location event back to the studio. As shown by the two edges extending from the output of the Kalman filter 416 in FIG. 4, this results in the generation of two new commands in the queue 500, including the "Location to 418" command 526 and the "Location to: 430" command 528, as shown in the queue 500 of FIG. 5F.

The commands flowing into and out of the queue 500 in FIGS. 5A-5F are merely representative of commands generated by the studio based on events received from the producers and processors, such as the producers and processors illustrated in the graph 400 of FIG. 4. It will be recognized that numerous other commands will be generated and processed through the queue 500 during a workout session, including events from additional producers and processors. It will also be recognized that the studio will generate different commands depending on the monitoring devices and associated producers used to generate events. For example, during one workout session where a user wears a heart rate strap, heart rate events may be processed through the studio, but in another workout session where no heart rate monitor is used, no heart rate events will be processed through the studio.

In addition to the events processed through the studio being different dependent on the monitoring devices used during a workout session, it will also be recognized that the studio itself may vary slightly depending on the processing capabilities of the associated hardware components. For example, processing of events on the personal electronic device 108 may be somewhat limited because of the limited processing power and limited connectivity of the personal electronic device. In contrast, processing of events on the remote server 112 may be significantly more complicated because of the more robust processing power and connectivity of the remote server 112. Thus, the graph 400 of the studio may look different at the personal electronic device 108 than at the remote server 112.

The elevation aggregate processor 412 of FIG. 4 provides an example of processing that may occur differently based on the location of the processing (e.g., whether on the personal electronic device 108 or the remote server 112). In at least one embodiment, the processor 412 on the user's personal electronic device 108 is significantly limited in comparison to the processor 412 on the remote server 112. For example, while raw GPS data from the GPS receiver may be used to arrive at altitude changes, this data is often unreliable and less than ideal. A significantly better source of altitude change data be altitude data associated with Geographic Information Systems (GIS) maps. Therefore, the processor 412 on the remote server 112 may be configured to use the GPS latitude/longitude information in association with GIS altitude information to arrive at an altitude change between various GPS data points that is much more accurate than using GPS information alone. Accordingly, the altitude change data provided by the elevation aggregate processor 412 of the remote server 112 may be deemed more reliable than that provided at the by personal electronic device 108. This provides the activity tracking system 100 with the opportunity to update the altitude change parameter presented to the user in association with a specific workout session. In particular, once the activity log 236 for a workout session is transmitted from the personal electronic device 108 to the remote server 112 (e.g., at the end of a workout session), the activity log may be reprocessed at the remote server 112 to arrive at a different altitude change parameter. As a result, the altitude change parameter presented to the user may change after further processing occurs at the remote server. For example, consider a workout session wherein the GPS data processed at the personal electronic device 108 indicates an altitude change of 500 meters, but the GPS data processed at the remote server 112 in association with GIS data indicates an altitude change of 1000 meters. While the 500 m altitude change parameter may be presented to the user on the display 216 of personal electronic device 108 at the closing moments of the workout session, further processing at the remote server 112, and subsequent transmission of updated altitude change parameters, will result in the 1000 m altitude change being presented to the user at some future time after the workout session ends.

The foregoing arrangement and studio configuration for an activity tracking system results in numerous improvements in the operation of the activity tracking system. Examples of such improvements will be appreciated in association with the foregoing description of the method of operating the activity tracking system and the related examples of FIGS. 7-10.

Method of Operating an Activity Tracking System

Figure 6:
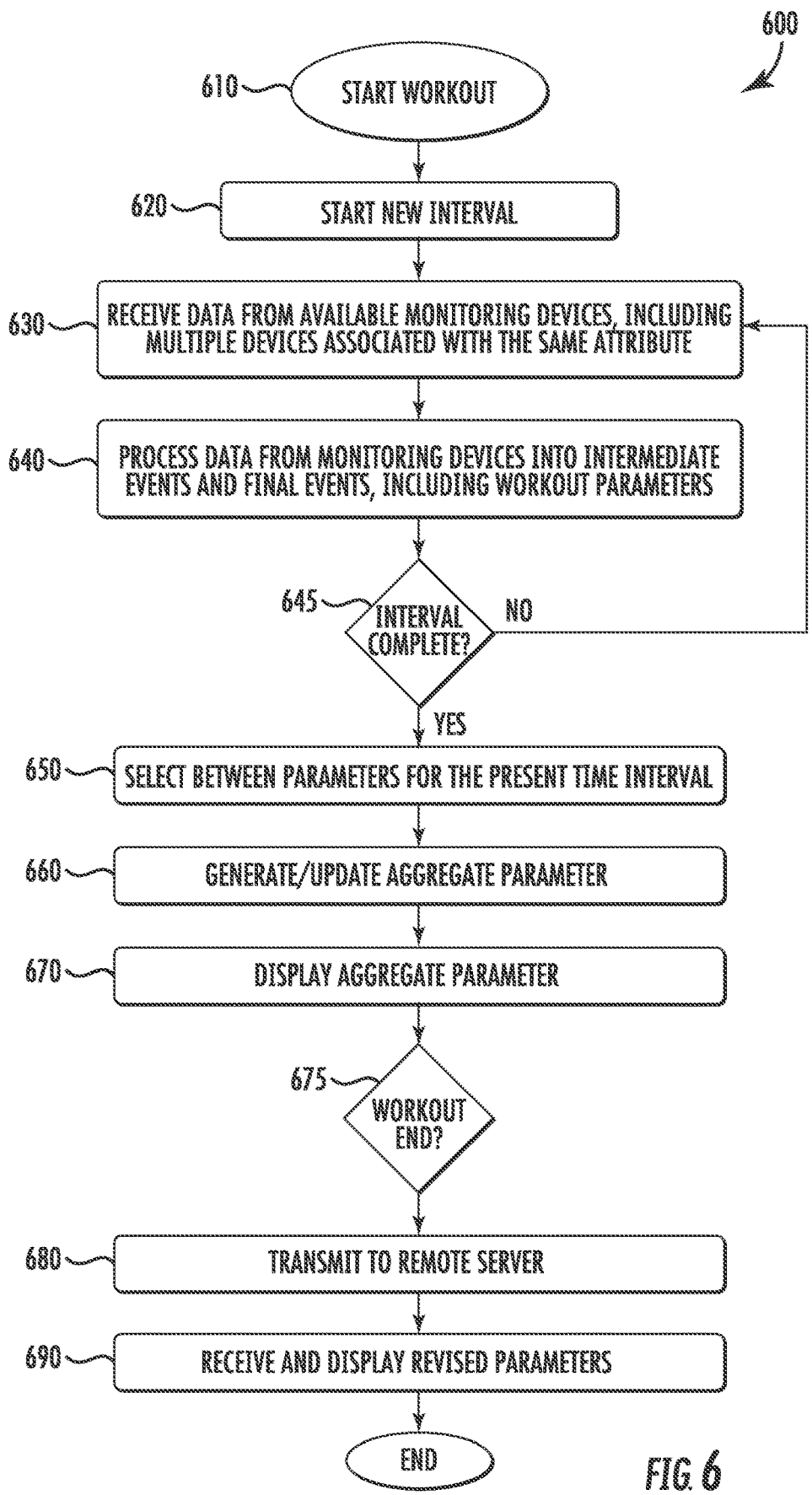
FIG. 6 is a block diagram of a method for operating a personal electronic device in the activity tracking system of FIG. 1 in order to provide activity data to a user during a workout session.

With reference now to FIG. 6, a flowchart is shown of a method 600 of operating the personal electronic device 108 of the activity tracking system. The method begins at block 610 where the activity tracking system 100 generates a command indicating that a workout has started for the user (e.g., see "Start Workout" command 510 discussed in association with FIG. 5A). As noted previously, this command may be generated automatically by user activity or manually by a user pressing a button or other selection on a GUI of the personal electronic device 108 or a monitoring device 104 in communication with the personal electronic device 108.

At block 620, a new time interval for the workout session begins. The time interval may be any of various time intervals as defined by the system 100 (e.g., 5 ms, 5 second, 5 minutes, etc.), but is typically a relatively short period of time (e.g., less than 5 seconds).

At block 630, the activity tracking system begins to receive data from various monitoring devices 104 carried by the user during the workout session. As noted previously, each of the monitoring devices 104 includes some type of activity sensor 170. For purposes of the description of the method 600, at least two of the monitoring devices are associated with the same workout attribute. For example, if the workout attribute is distance traveled, a first monitoring device is a smartphone with a GPS receiver and a second monitoring device is a food pod with an accelerometer configured to determine stride length.

As shown in block 640, the activity data received from the monitoring devices during the workout session is delivered to the studio for processing in accordance with the defined rules (e.g., the studio graph 400). As discussed previously, processing of the activity data results in a sequence of intermediate events and final events which are processed by the studio queue 500 in the order received. The events include parameters for the workout attribute (e.g., distance traveled). For example, a first parameter for distance traveled may be based on data received from the GPS receiver, and a second parameter for distance traveled may be based on data received from the foot pod accelerometer.

At block 645 a decision is made whether the time interval is complete for calculation of the parameter for the workout attribute. If the time interval is not complete, the method returns to block 630 and additional data is received from the monitoring devices at block 630 and subsequently processed at block 640. However, once the time interval is complete, the method moves to block 650 where a selection is made between the first parameter for the workout attribute and the second parameter for the workout attribute. As discussed previously, selection between two different parameters may be based on a number of different factor, such as, for example, a preferred source of data, the integrity of the data from a particular source, the time during the workout session in which the data is received, user preferences or user profile data, environmental conditions for the workout session, or any of various other factors.

After one of the two parameters is selected in block 650, the method continues and updates an aggregate parameter for the workout attribute in block 660. The aggregate parameter is a combined parameter for the workout attribute over all of the time intervals for the workout session. Thus, the aggregate parameter repeatedly updates with each new time interval of the workout session. If the workout parameter is distance traveled, the aggregate parameter will become greater over the duration of the workout. On the other hand, if the workout parameter is something that has an ebb and flow, such as an average, the aggregate parameter may repeatedly increase and decrease over the duration of the workout.

At block 670, the aggregate parameter is displayed to the user on the display 216 of the personal electronic device 108. The aggregate parameter may be displayed along with other any number of other parameters on the display 216. For example, the display 216 may show the aggregate parameter as a total distance traveled, but may also show an interval distance, average speed, current heart rate, etc.

At block 675, a decision is made whether the workout has ended. As noted previously, this command to terminate a workout may be generated automatically by user inactivity or manually by a user pressing a button or other selection on a GUI of a monitoring device 104 or personal electronic device 108. If the workout has not ended at block 675, the method returns to block 620 and a new time interval begins with new parameters calculated for a new time interval. As multiple time intervals pass, the studio generates a stream workout parameters for the workout session, including a stream of first workout parameters associated with a first monitoring device and a stream of second workout parameters associated with a second monitoring device (as noted at block 640). For each time interval, either the first workout parameter or the second workout parameter is selected (as noted at block 650), and as a result, the studio also generates a final stream of workout parameters. Based on this final stream of workout parameters, an aggregate workout parameter may be generated (as noted at block 660). After the workout session finally terminates (as noted at block 675), the method moves to block 680 and the activity log 236 and/or event data 240 is transmitted to the remote server 112.

After the remote server 112 receives the activity log 236 and/or event data 240 from the personal electronic device, the remote server re-processes all of the activity data using the studio as defined at the remote server 112. Because the processing and memory capabilities of the remote server 112 are significantly greater than those of the personal electronic device, additional or different processing of the event data may occur. For example, as discussed previously, the remote server 112 may have the ability to better calculate elevation change over the course of the workout based on GIS data available to the remote server 112 that is not immediately available at the personal electronic device. As another example, the remote server 112 may have the ability to better filter noisy GPS data and then use that data for a particular interval in lieu of user stride length data when arriving at an aggregate distance traveled. Therefore, the studio of the remote server 112 is independent of the studio at the personal electronic device 108 and is configured to generate workout parameters that are independent of those calculated at the personal electronic device. As a result, the parameters generated at the remote server 112 may be associated with the same workout attributes as those generated at the personal electronic device or may be entirely new parameters associated with new workout attributes that are completely unique to processing at the remote server 112. These new and/or revised parameters calculated at the remote server 112 are then transmitted back to the personal electronic device 108.

At block 690, the personal electronic device 108 receives the data transmitted from the remote server 112 and stores the new and/or revised parameters. Based on the received parameters, a revised aggregate parameter for the workout attribute (e.g., distance traveled, elevation change, etc.) is presented to the user on the display 216 of the personal electronic device 108. In this manner, although a first set of parameters are presented to the user during a workout session, more accurate revised parameters may be presented to the user at the end of the workout session.

It will be recognized that wile FIG. 6 illustrates one exemplary method of operating a personal electronic device of the activity tracking system, various alternative methods are also contemplated. For example, in at least one embodiment, the activity data is periodically transmitted from the personal electronic device 108 to the remote server 112 during the workout session. As a result, more accurate parameters for various workout attributes are received from the remote processing server 112 throughout the workout session, and not only after completion of the workout session.

Exemplary Operation of Activity Tracking System

Figure 7:
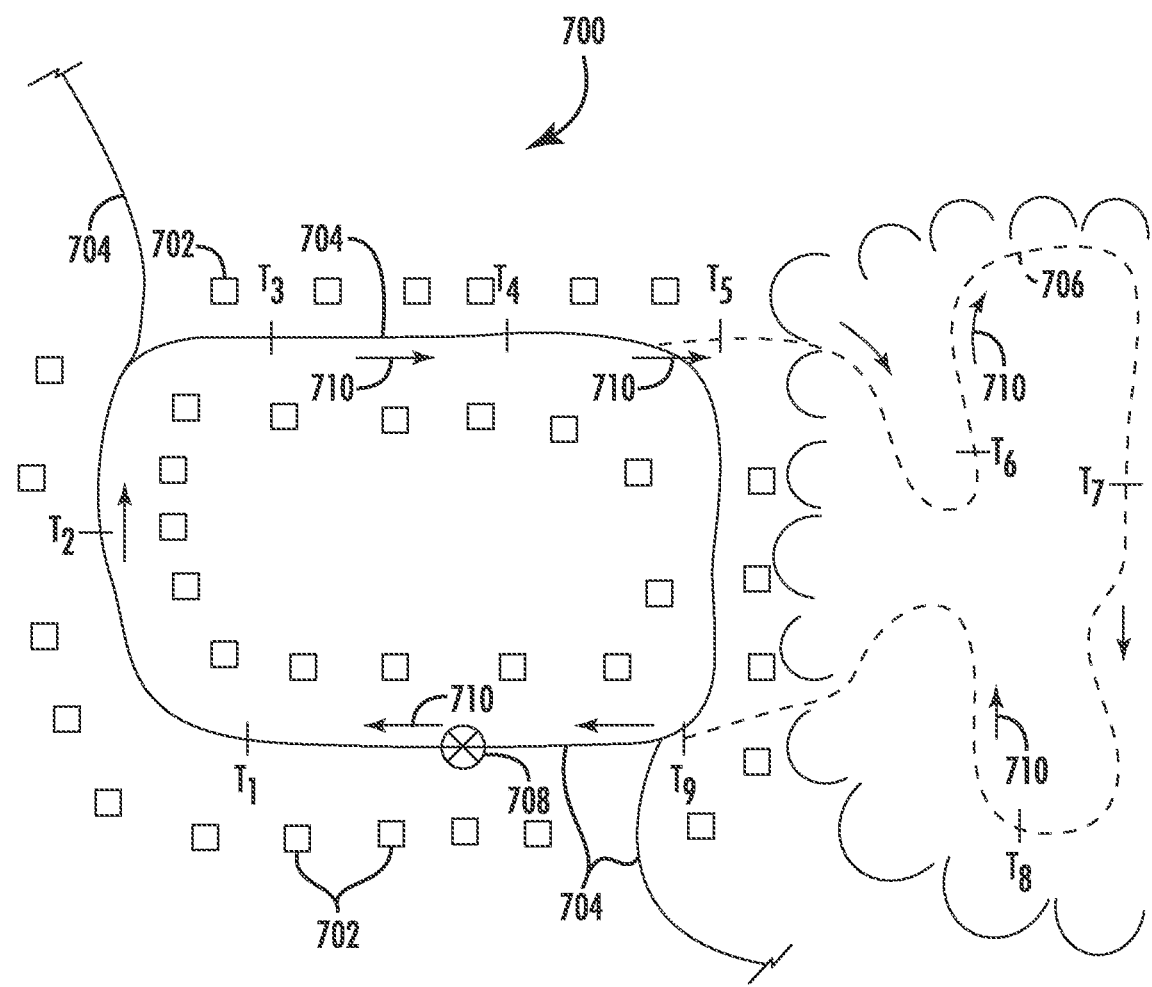
FIG. 7 is a map illustrating a course traveled by a user of the activity tracking system during a workout session.
Figure 8A:
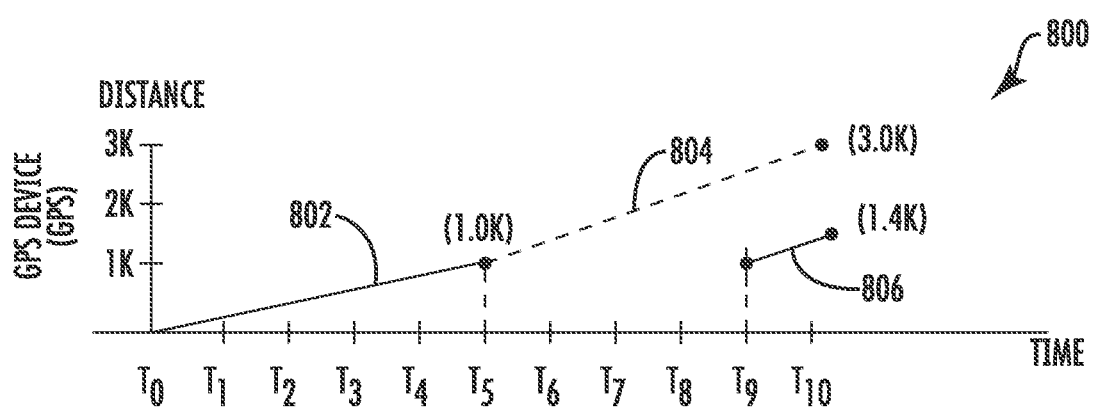
FIG. 8A is a first grid of distance data collected during the workout session of FIG. 7.
Figure 8B:
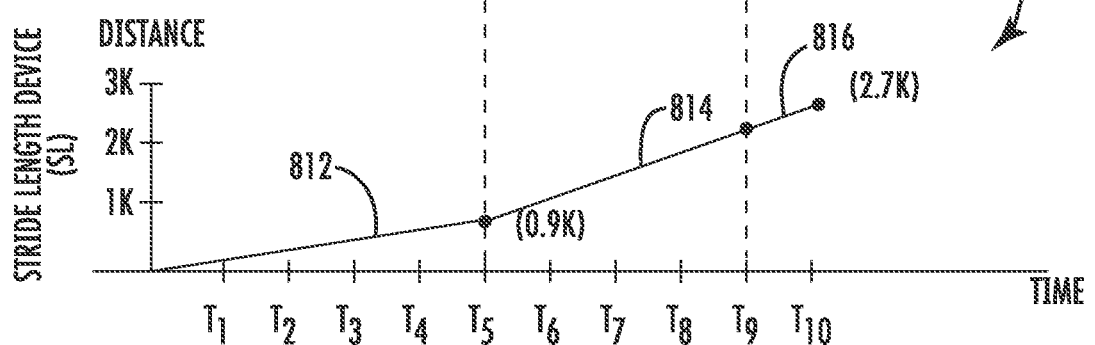
FIG. 8B is a second grid of distance data collected during the workout session of FIG. 7.
Figure 8C:
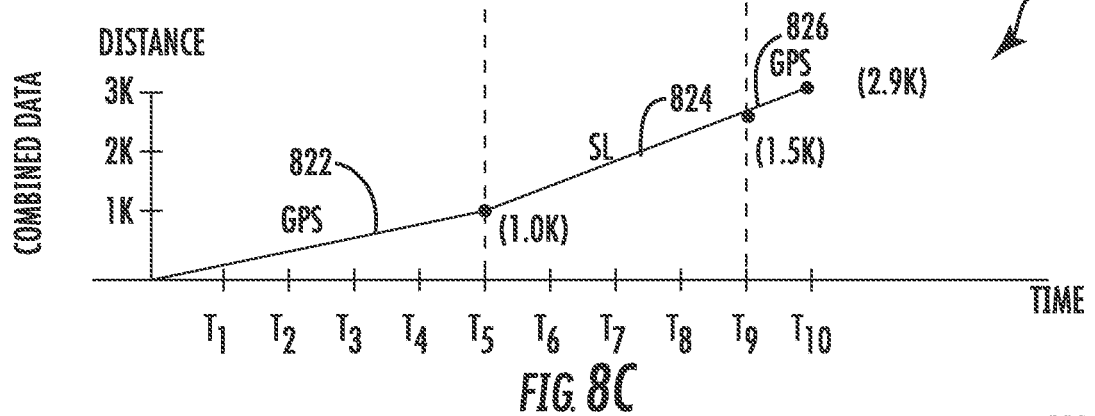
FIG. 8C is a third grid of distance data collected during the workout session of FIG. 7.

With reference now to FIGS. 7-8C, an example of operation of the activity tracking system 100 is shown illustrating an improvement in computer capabilities provided by the activity tracking system 100. FIG. 7 shows a map 700 of a neighborhood where a particular user of the activity tracking system 100 lives. The neighborhood includes a number of houses 702 lining a network of streets 704. The neighborhood also includes walking trails 706 (illustrated by dotted lines) that extend into a wooded area in the neighborhood. The user often runs a 3K (i.e., 3 km) route in the neighborhood using a combination of streets 704 and trails 706. The user begins from a location near his home 708 (as marked by the X) and proceeds through the route as indicated by the arrows 710. The streets in the 3K route tend to be in open areas where GPS signals are easily received by a smartphone or other personal electronic device having a GPS receiver. However, the trails in the 3K route extend through a heavily wooded section with a dense canopy of tree branches that severely limits the receipt of GPS signals from GPS satellites.

FIG. 7 includes several time markers indicating the user's position at various time intervals for the workout session as the user traverses the route 710. The route 710 includes time markers T1-T10, each of which represent the user's position at the end of a time interval during the workout session, each of the time intervals being of equal duration. Assuming the user takes twenty minutes to traverse the 3K route 710, the time intervals T1-T10 are two minutes each (i.e., 20 minutes/10 intervals=2 minutes/interval). These intervals T1-T10 are used below in association with the calculation of workout parameters in each of FIGS. 8A-9C below.

However, it will be recognized that the time intervals used to calculate workout parameters during any particular workout session will likely be much shorter such that many more time intervals occur over the duration of any given workout session. For purposes of this example, assume that the user begins the workout at a relatively slow pace such that the actual distance traveled from the X to the T5 marker is 1K. Then, assume that the user doubles this pace for the second half of the workout such that the distance from the T5 marker back to the X is 2K.

The user traversing the 3K route 710 wears several monitoring devices during the workout session including (a) a personal electronic device in the form of a smart watch with GPS and heart rate sensor capabilities, (b) smart shoes with an accelerometer that generates acceleration data, and (c) a chest strap with a heart rate monitor. With these monitoring devices being carried by the user, a number of workout parameters may be generated during the workout session. These workout parameters include (i) distance traveled based on the GPS location data from the smart watch, (ii) distance traveled based on stride length data calculated from the acceleration data, (iii) wrist heart rate based on the heart rate data from the smart watch, and (iv) chest heart rate based on the chest strap with a heart rate monitor.

FIG. 8A shows the workout parameters for distance traveled by the user based on the location data from the smart watch. The workout parameters of FIG. 8A are shown on a grid 800 with of the distance traveled by the user on the y-axis and time on the x-axis. As shown in FIG. 8A, the user travels at a relatively steady but slow pace at the first half of the workout session. In particular, the user travels a total of about 1 km during time intervals T1-T5, as illustrated by line segment 802 in FIG. 8A. Because this portion of the route 710 is in a relatively open area with ready access to GPS signals, the GPS data from the smart watch is reliable during this time. However, just after time T5 (i.e., at the start of interval T6), the user enters the trail 706 in wooded area of the route and the GPS data is sporadic and/or lost. Accordingly, little or no GPS data is collected for the user when the user is on the trail 706 during time intervals T6-T9. The dotted line segment 804 in FIG. 8A represented the data that would have been collected over this time period if GPS data were available. As shown by the dotted line segment 804, the user ends the workout session having traveled 3.0 km. For the last interval of the workout session after T9 (i.e., during time interval T10), the user leaves the trail 706 and returns to the road 704 where GPS signals are again received. Accordingly, during this time period an additional distance for the user is calculated, as indicated by line segment 806 in FIG. 8A. However, because no data was collected from the GPS receiver during time periods T6-T9, the total distance traveled by the user at the end of the workout session is skewed. In particular, even though the actual distance traveled by the user during the workout session was 3K, the recorded distance based on GPS data alone is about 1.4 K. Thus, if only GPS data is used to calculate the distance traveled by the user more than half of the actual distance traveled (i.e., 3K) is lost.

FIG. 8B shows the workout parameters for distance traveled by the user based on the location data from the accelerometer of the smart shoe (i.e., the stride length data). The workout parameters of FIG. 8B are shown on a grid 810 with of the distance traveled by the user on the y-axis and time on the x-axis. As shown in FIG. 8B, the smart shoe data is collected during the entire workout session, including each of intervals T1-T10. However, the distance calculations made based on the smart shoe data are somewhat inaccurate. In particular, the distance calculations are off by some amount of the actual distance (e.g., a 10% error). Thus, as noted at the end of line segment 812, the distance calculation shows that the user traveled 0.9K at this point during the workout session, although the actual distance traveled was 1.0K.

Similarly, at the end of time interval T10 in FIG. 8B, the total distance traveled is only calculated as 2.7K, as noted by the end of line segment 816, although the actual distance was 3.0K. As a result, even though the stride length data was collected for the entire workout, because the data collected was not accurate, the total distance traveled during the workout session is still not accurate (i.e., the total distance traveled is off by about 10%).

Figure 5F:
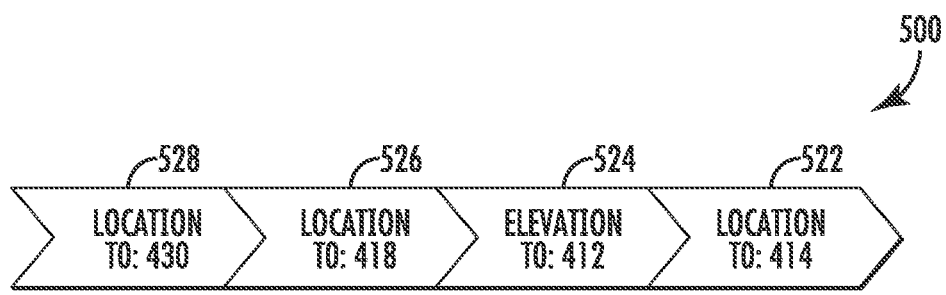
FIG. 5F shows the queue of FIG. 5E after processing some commands and receiving additional commands.

FIG. 8C shows the workout parameters for distance traveled when the activity tracking system 100 described herein is used, including the method of FIG. 6 and the related processing described with reference to FIGS. 4-5F. As shown on the grid 820 of FIG. 8C, the workout parameters used to calculate the total distance traveled by the user include a combination of workout parameters generated by both the GPS data from the smart watch (as shown in FIG. 8A) and the stride data from the smart shoe (as shown in FIG. 8B). During the first half of the workout session, i.e., during the periods T1-T5, the activity tracking system 100 uses the GPS data to calculate total distance traveled, as this data is determined to be the most accurate distance data available to the activity tracking system 100 during this time. Thus, as noted at the end of line segment 822, the total distance traveled by the user is accurately determined to be 1K at the end of time interval T5. However, when the GPS data is lost during times T6-T9, the activity tracking system stops using GPS data and switches to the stride length data from the smart shoe. Although this data is not as accurate, the total distance traveled by the user continues to increase during this time, as noted by line segment 824 in FIG. 8C. Then, at the end of time interval T9, the GPS data becomes available again, and the activity tracking system switches back to the GPS data, as indicated by line segment 826. Because the activity tracking system was able to advantageously select between the GPS data and the stride length data, the calculation of the total distance traveled during the workout session is much more accurate (i.e., 2.9K) than if only the partial GPS data (i.e., FIG. 8A) or if only the stride length data (i.e., FIG. 8B) were used.

As noted above, the activity tracking system 100 is configured to present the more accurate data (i.e., the data of FIG. 8C) to the user during the workout session by selecting between multiple monitoring devices. Additionally, the activity tracking system is also configured to reprocess the activity data following a workout session in order to arrive at more accurate workout parameters. In particular, at the end of a workout session, the activity log 236 (including all activity data collected during the workout session) and the event data 240 (including all events generated by the personal electronic device during the workout session) are transmitted to the remote processor 112 and the remote processor 112 reprocess the data in the activity log 236 to arrive amended workout parameters, which are then transmitted back to the personal electronic device 108 and presented to the user.

Figure 8D:
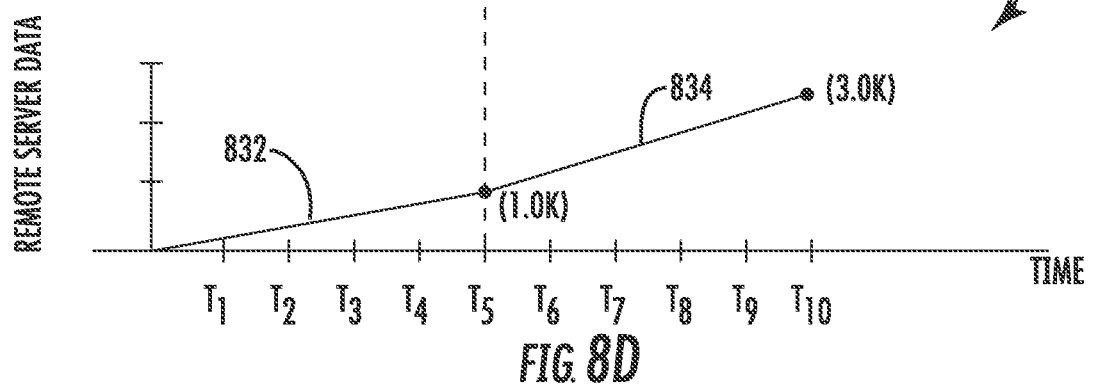
FIG. 8D is a fourth grid of distance data collected during the workout session of FIG. 7.

FIG. 8D shows an example of revised workout parameters on a grid 830 following reprocessing of the activity data at the remote server 112. As shown in FIG. 8D, the total distance traveled by the user over time intervals T1-T5 is exactly the same as that shown in FIG. 8C because those workout parameters more accurately represented the 1K traveled by the user during time periods T1-T5. Accordingly, the end of line segment 832 in FIG. 8D is at the 1.0K mark. However, as noted by line segment 834 in FIG. 8D, the workout parameters for total distance traveled by the user during time periods T6-T10 have been amended by the remote server 112 to accurately show that the user traveled a total of 3.0K during the workout session. As noted previously, the expanded processing power at remote server 112 makes more accurate calculations such as this possible. For example, the remote processing server 112 may be able to crowd-source data from numerous other users who traversed the route 710, including trail 706, and determine that the most likely distance of the trail is 1.6K (not the 1.5K as indicated in FIG. 8C). This may be accomplished using any of various methods. As one example, GPS data for past workouts traversing trail 706 actually be available (e.g., consider users who traversed the route 710 in the winter when the leaf cover in the wooded area was diminished such that GPS signals were received). As another example distance collected from the smart shoes of users who commonly travel between the points T5 and T9 of the map 700 (see FIG. 7) may show that the average length traveled by users during a workout session is 1.6K. As another example, the remote processing server may have access to past workouts of the same user which show that the distance traveled by the user on the trail 706 is typically actually 1.6K. Of course, various other methods and tools may also be available to the remote processing server 112 to arrive at a revised distance parameter.

In addition to the ability to reprocess the activity data, it will also be recognized that the remote processing server 112 may be configured to determine additional workout parameters that could not be determined at the personal electronic device 108 for any of various reasons. For example, in the foregoing example, although the personal electronic device 108 is able to display a distance for the user as he travels along the trail 706 based on the stride data, there may be no elevation data available at this time. However, the remote processing server may be configured to determine that a user travelling about 1.5 or 1.6K between the points labelled T5 and T9 on the map 700 of FIG. 7 likely traveled along the trail 706, and the elevation change along this trail is 100 feet. This data for elevation change may then be added to any other elevation change data determined during the workout (e.g., elevation change based on GPS data) and added to the total elevation change parameter for the workout session.

Figure 9A:
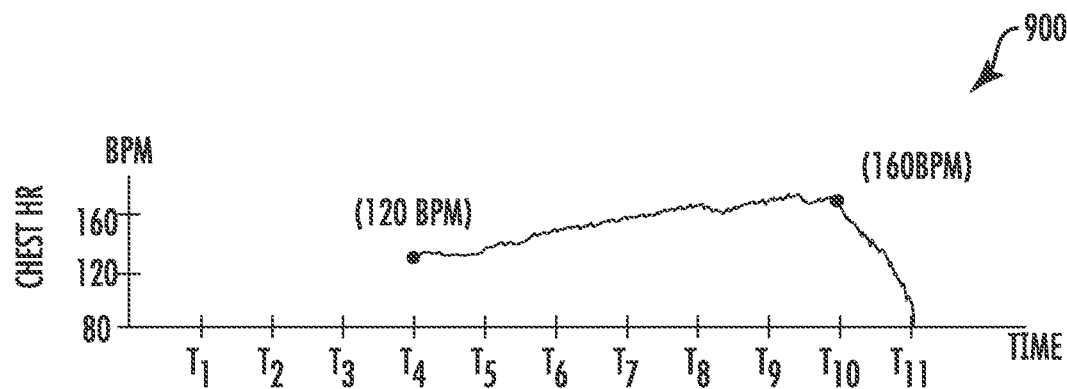
FIG. 9A is a first grid of heart rate data collected during the workout session of FIG. 7.
Figure 9B:
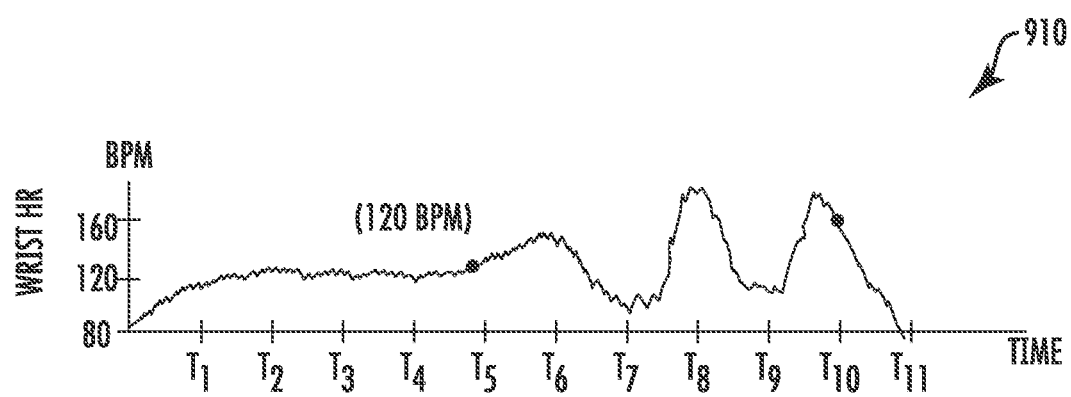
FIG. 9B is a second grid of heart rate data collected during the workout session of FIG. 7.
Figure 9C:
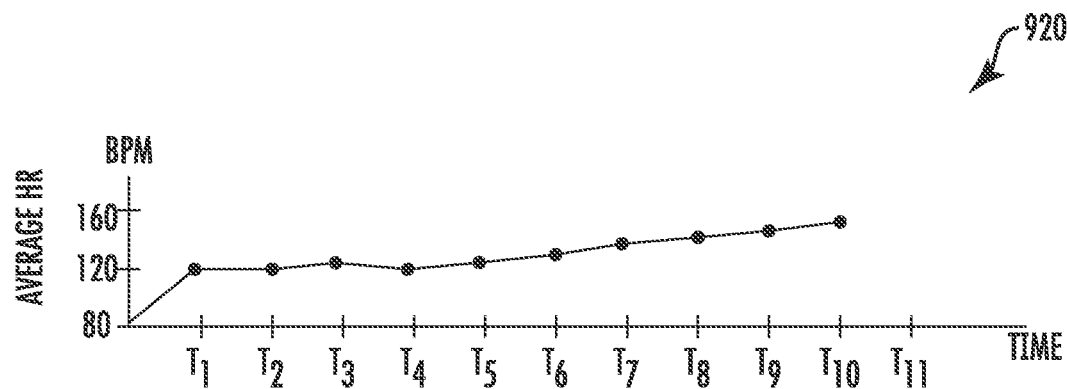
FIG. 9C is a third grid of heart rate data collected during the workout session of FIG. 7.

With reference now to FIGS. 9A-9C another example of workout parameters selectively incorporated into aggregate data for a workout session is shown. In particular, FIGS. 9A-9C show heart rate data for the user during traversal of the route 710 of FIG. 7. FIG. 9A shows a current heart rate parameter for the user based on heart rate data from the chest strap heart rate sensor. The user's heart rate is represented on the y-axis of the grid 900, and time is shown on the x-axis. Unfortunately, the user failed to wet the electrodes on the heart rate sensor at the start of the workout session, so no heart rate data is collected at the start of the workout during time intervals T1-T4. However, at the end of time interval T4, perspiration from the user sufficiently wets the electrodes, and heart rate data is then available for the remainder of the workout. As shown in FIG. 9A, the user's heart rate gradually increases during the workout from 120 beats-per-minute (BPM) at the end of time interval T5 to 160 BPM when the workout ends at the end of time interval T10. The user's heart rate then returns to a resting heart rate of 80 BPM during a cool down period T11.

FIG. 9B shows heart rate data taken from the smart watch during the workout session. The heart rate data from the smart watch is typically relatively accurate for lower heart rates during more sedentary activity. However, the accuracy of the heart rate data from the smart watch typically diminishes with higher heart rates and more vigorous activities. Accordingly, as shown on the grid 910 of FIG. 9B, during a first half of the workout session (i.e., T1-T5) when the user is moving relatively slowly, the user's heart rate is accurately measured to be near 120 BPM. When the user doubles the pace during the second part of the workout session (i.e., T6-T10), the heart rate data becomes sporadic and the measured heart rate changes rapidly and without explanation between extremes. In particular, the measured heart rate during time intervals T6-T10 swings up and down several times between 80 and 160 BPM. Clearly, this heart rate data during time intervals T6-T10 appears to be suspicious.

FIG. 9C shows an average heart rate for the user when the activity tracking system 100 described herein is used, including the method of FIG. 6 and the related processing described with reference to FIGS. 4-5F. As shown in FIG. 9C, the workout parameters used to calculate the average heart rate include a combination of workout parameters generated by the chest strap (as shown in FIG. 9A) and the smart watch (as shown in FIG. 9B). In particular, because no heart rate data is available for the chest strap during time intervals T1-T2, the heart rate data from the smart watch is used to determine average heart rate. However, when a heart rate signal from the chest strap becomes available at the end to time T4, the system switches to the chest strap in order to determine an average heart rate of the user, and continues using the chest strap data for the remainder of the workout. As a result, relatively accurate heart rate data is available for the entire workout (including each of time intervals T1-T10). It will be recognized that if only one of these monitoring devices were used during the workout, the average heart rate for the workout session would be significantly skewed, as either the heart rate data from time intervals T1-T4 would be missing (as in FIG. 9A), or the heart rate data from time intervals T6-T10 would be inaccurate.

Similar to the distance activity data discussed above with reference to FIGS. 8A-8D, the heart rate activity data is also transmitted to the remote server 112 at the end of the workout session. The remote server 112 is configured to reprocess on the heart rate data and confirm its validity or revise the data to make it more accurate. For example, the remote server 112 may perform further filtering on the heart rate data that is not available at the personal electronic device.

As described herein, the activity tracking system 100 includes specific improvements to computer functionality by improving the manner in which the system 100 generates activity data to be presented to the user. Known fitness tools generate activity data based on only a single monitoring device. In contrast, in at least one embodiment, the activity tracking system 100 activity data by selectively utilizing activity data from multiple monitoring devices. Accordingly, the monitoring devices are used in a non-conventional manner to reduce errors in generating parameters for workout attributes as a user moves during a workout session. In addition, in at least some embodiments, the activity tracking system utilized distributed networking including both local processing and remote processing of activity data in order to generate improved activity data for presentation to the user both during and after a workout session. The remote processing configuration reduces the processing demands of the controller 218 of the personal electronic device 108, thereby reducing the electrical power consumed by the personal electronic device 108. Moreover, the powerful remote server 112 generates workout parameters more quickly than the controller 218 while also providing additional processing to improve the accuracy of the workout parameters and thereby improve the user experience.

As explained above, the activity tracking system 100 and associated computer components disclosed herein function differently than conventional activity tracking systems. Known processes for generating workout parameters involve processing data from a single monitoring device selected for use during a workout session. This approach generates workout parameters that are typically insufficiently accurate. In contrast, the activity tracking system 100 disclosed herein entails an unconventional technological solution (e.g., including enhancing data in a distributed fashion) to a technological profiler accurate data generated from sensor devices). While the activity tracking system may include a number of conventional computer components, the computer components are configured to operate in an unconventional manner in order to achieve an improvement in computer functionality.

While the activity tracking system has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

It will be appreciated that the foregoing aspects of the present disclosure, or any parts or functions thereof, may be implemented using hardware, software, firmware, tangible non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An activity tracking system for providing activity data associated with a user during a workout session, the workout session defined by a start time and an end time, the activity tracking system comprising:
   a first activity sensor configured to be carried by the user and generate first activity data during a first time period and a second time period of the workout session, the first activity data associated with a specific workout attribute of the workout session;

a second activity sensor configured to be carried by the user and generate second activity data during the first time period and the second time period of the workout session, the second activity data also associated with the workout attribute of the workout session, the second activity sensor being a different type of sensor than the first activity sensor;

a controller configured to receive both the first activity data from the first activity sensor and the second activity data from the second activity sensor during the workout session, the controller configured to determine that the first activity data includes reliable first activity data generated during the first time period of the workout session and unreliable first activity data generated during the second time period of the workout session, generate a first parameter for the workout attribute based on the reliable first activity data generated during the first time period of the workout session, generate a second parameter for the workout attribute based on the second activity data generated during the second time period of the workout session, and generate an aggregate parameter for the workout attribute based on both the first parameter and the second parameter;

a display device carried by the user, the display device including a display screen configured to display the aggregate parameter for the workout attribute during the workout session; and a remote server, the remote server configured to receive the first activity data and the second activity data generated during the workout session, the remote server further configured to generate a third parameter for the workout attribute after the workout session based on at least one of the first activity data and the second activity data;

wherein the display device is configured to receive the third parameter from the remote server and display the third parameter on the display screen after the workout session.

2. The activity tracking system of claim 1 wherein the third parameter is a revised aggregate parameter for the workout attribute and is further based on crowd-sourced data for the workout attribute.

3. The activity tracking system of claim 1 wherein the workout attribute is a primary workout attribute and wherein the third parameter is for a secondary workout attribute.

4. The activity tracking system of claim 1 wherein the first parameter for the workout attribute is associated with the first activity sensor, and wherein the second parameter for the workout attribute is associated with the second activity sensor.

5. The activity tracking system of claim 4 wherein the first parameter for the workout attribute is one of a plurality of first parameters associated with different time intervals during the workout session, wherein the second parameter for the workout attribute is one of a plurality of second parameters associated with different time intervals during the workout session, and wherein the controller is configured to generate the aggregate parameter for the workout attribute based on selected ones of the plurality of first parameters and the plurality of second parameters, wherein the selected ones of the plurality of first parameters and the plurality of second parameters are each associated with different time intervals during the workout session, and wherein the selected ones includes less than all of the plurality of first parameters and the plurality of second parameters.

6. The activity tracking system of claim 5 wherein the selected ones of the plurality of first parameters and the plurality of second parameters are based at least in part on (i) a preferred data source and (ii) a determined data integrity of the first data activity data and the second activity data for a particular time interval during the workout session.

7. The activity tracking system of claim 1 wherein the workout attribute of the workout session is a distance traversed during the workout session, wherein the first activity sensor is a GPS receiver, and wherein the second activity sensor is an accelerometer.

8. The activity tracking system of claim 7 wherein the GPS receiver, the controller and the display device are included on a personal electronics device configured to be carried by the user.

9. The activity tracking system of claim 1 wherein the workout attribute of the workout session is an average heart rate, wherein the first activity sensor is a heart rate chest band, and wherein the second activity sensor is a heart rate wrist band.

10. A method for providing activity data to a user for a workout session, the workout session defined by a start time and an end time, the method comprising:

generating first activity data during a first time interval and a second time interval of the workout session using a first activity sensor carried by the user, the first activity data associated with a workout attribute of the workout session;

generating second activity data during the second time interval of the workout session using a second activity sensor carried by the user, the second activity data also associated with the workout attribute, the second activity sensor being a different type of sensor than the first activity sensor;

receiving at a processor the first activity data from the first activity sensor and the second activity data from the second activity sensor during the workout session;

determining that the first activity data includes reliable first activity data generated during the first time interval of the workout session and unreliable first activity data generated during the second time interval of the workout session, generating, at the processor, a first parameter for the workout attribute based on the reliable first activity data generated during the first time interval of the workout session;

generating at the processor a second parameter for the workout attribute based on the second activity data generated during the second time interval of the workout session;

generating, at the processor, an aggregate parameter for the workout attribute based on both the first parameter and the second parameter;

displaying, on a display device, the aggregate parameter for the workout attribute during the workout session;

transmitting the reliable first activity data and the second activity data generated during the workout session to a remote server;

generating, after the workout session at the remote server, a third parameter based on at least one of the first activity data and the second activity data;

transmitting the third parameter to the display device; and displaying, on the display device, the third parameter after the workout session.

11. The method of claim 10 wherein the third parameter is a reprocessed aggregate parameter for the workout attribute.

12. The method of claim 10 wherein the workout attribute is a primary workout attribute and wherein the third parameter is for a secondary workout attribute.

13. The method claim 10 wherein the first parameter for the workout attribute is associated with the first activity sensor, and wherein the second parameter for the workout attribute is associated with the second activity sensor.

14. The method of claim 13 wherein the first parameter for the workout attribute is one of a plurality of first parameters associated with different time intervals during the workout session, wherein the second parameter for the workout attribute is one of a plurality of second parameters associated with different time intervals during the workout session, and wherein the aggregate parameter for the workout attribute is based on selected ones of the plurality of first parameters and the plurality of second parameters, wherein the selected ones of the plurality of first parameters and the plurality of second parameters are each associated with different time intervals during the workout session.

15. The method of claim 14 wherein the selected ones of the plurality of first parameters and the plurality of second parameters are based at least in part on (i) a preferred data source and (ii) a determined data integrity of the first data activity data and the second activity data for a particular time interval during the workout session.

16. The method of claim 10 wherein the workout attribute of the workout session is a speed of travel during the workout session, wherein the aggregate parameter is an average speed of travel during the workout session, wherein first activity sensor is a GPS receiver, and wherein the second activity sensor is an accelerometer.

17. The method of claim 10 wherein the workout attribute of the workout session is a distance traversed during the workout session, wherein the aggregate parameter is a total distance traversed during the workout session, wherein the first activity sensor is a GPS receiver, and wherein the second activity sensor is an accelerometer.

18. A method for automatically processing and reprocessing user activity data for a workout session performed by a user, the workout session defined by a start time and an end time, the method comprising:

obtaining a set of rules that define workout parameters for a specific workout attribute as a function of events generated by a first activity sensor and a second activity sensor carried by the user;

receiving a sequence of events from the first activity sensor and the second activity sensor during the workout session;

generating a sequence of intermediate events based on the received sequence of events by evaluating the received sequence of events against the set of rules;

generating a stream of first workout parameters and a stream of second workout parameters based on the generated sequence of intermediate events by evaluating the generated sequence of intermediate events against the set of rules, each of the first workout parameters associated with the first activity sensor and each of the second workout parameters associated with the second activity sensor;

determining that the stream of first workout parameters includes reliable first workout parameters generated during a first time period of the workout session and unreliable first workout parameters generated during a second time period of the workout session;

generating a final stream of workout parameters by selecting final workout parameters from both the reliable first workout parameters and the second workout parameters;

generating an aggregate workout parameter for the workout session by evaluating the final stream of workout parameters against the set of rules; and displaying the aggregate workout parameter on a display device carried by the user during the workout session.

19. The method of claim 18 wherein the set of rules that define the workout parameters are defined by a plurality of interconnected processing engines, wherein each processing engine is configured to receive an event and output an event.

20. The method of claim 19 wherein generating the stream of first workout parameters and generating the stream of second workout parameters includes loading a queue with instructions for sending events to respective ones of the plurality of interconnected processing engines according to the set of rules.

* * * * *